United States Patent
Niwa

(10) Patent No.: US 12,155,294 B2
(45) Date of Patent: Nov. 26, 2024

(54) ELECTRIC WORK MACHINE

(71) Applicant: MAKITA CORPORATION, Anjo (JP)

(72) Inventor: Akira Niwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 345 days.

(21) Appl. No.: 17/632,949

(22) PCT Filed: Jun. 19, 2020

(86) PCT No.: PCT/JP2020/024241
§ 371 (c)(1),
(2) Date: Feb. 4, 2022

(87) PCT Pub. No.: WO2021/049124
PCT Pub. Date: Mar. 18, 2021

(65) Prior Publication Data
US 2022/0337121 A1    Oct. 20, 2022

(30) Foreign Application Priority Data

Sep. 11, 2019 (JP) ................................ 2019-165542

(51) Int. Cl.
H02K 7/14        (2006.01)
H02K 1/14        (2006.01)
(Continued)

(52) U.S. Cl.
CPC ............... *H02K 7/145* (2013.01); *H02K 1/14* (2013.01); *H02K 3/18* (2013.01); *H02K 7/003* (2013.01); *B25F 5/02* (2013.01)

(58) Field of Classification Search
CPC .... B25F 5/00; B25F 5/02; H02K 1/14; H02K 1/146; H02K 1/148; H02K 11/215;
(Continued)

(56) References Cited

U.S. PATENT DOCUMENTS 8,810,091 B2 *   8/2014   Sato ....................... H02K 11/25
                                                         310/71
9,608,492 B2 *   3/2017   Nagumo .................. H02K 3/28
(Continued)

FOREIGN PATENT DOCUMENTS

CN    102593995 A    7/2012
JP    S5466103 U     5/1979
(Continued)

OTHER PUBLICATIONS

Office Action from the Japanese Patent Office dispatched Aug. 8, 2023 in related Japanese application No. 2019-165542, and machine translation thereof.
(Continued)

Primary Examiner — Alex W Mok
(74) Attorney, Agent, or Firm — J-TEK LAW PLLC; Jeffrey D. Tekanic; Scott T. Wakeman

(57) ABSTRACT

An electric work machine includes: a motor having a rotor disposed in an interior of a stator and being rotatable about a rotational axis; and an output shaft, on which a tool accessory is mountable and which is configured to be driven using motive power output from the motor. The stator includes: a stator core; a coil wound on a portion of the stator core; and a fusing terminal disposed more inward in a radial direction of the stator core than the coil and being connected to the coil.

19 Claims, 26 Drawing Sheets

(51) Int. Cl.
  *H02K 3/18* (2006.01)
  *H02K 7/00* (2006.01)
  *B25F 5/02* (2006.01)

(58) Field of Classification Search
  CPC ...... H02K 2203/09; H02K 3/18; H02K 3/325; H02K 3/522; H02K 7/003; H02K 7/145
  USPC .................................................. 310/216.001
  See application file for complete search history.

(56) References Cited

U.S. PATENT DOCUMENTS

| | | | |
|---|---|---|---|
| 9,825,509 B2* | 11/2017 | Nagumo | H02K 3/52 |
| 9,948,162 B2* | 4/2018 | Nagahama | H02K 11/215 |
| 10,236,740 B2* | 3/2019 | Kimpara | H02K 3/30 |
| 2007/0178723 A1 | 8/2007 | Kataoka et al. | |
| 2012/0112581 A1* | 5/2012 | Maekawa | H02K 11/25 |
| | | | 310/71 |
| 2015/0069864 A1* | 3/2015 | Nagahama | H02K 7/116 |
| | | | 310/50 |
| 2018/0115215 A1* | 4/2018 | Miwa | H02K 11/33 |
| 2018/0205288 A1 | 7/2018 | Nagahama et al. | |
| 2018/0233984 A1* | 8/2018 | Ogawa | H02K 5/1732 |
| 2021/0099053 A1 | 4/2021 | Nagahama et al. | |
| 2023/0170768 A1 | 6/2023 | Nakamura et al. | |

FOREIGN PATENT DOCUMENTS

| | | |
|---|---|---|
| JP | 2007209100 A | 8/2007 |
| JP | 2010028889 A | 2/2010 |
| JP | 2014143858 A | 8/2014 |
| JP | 2015056953 A | 3/2015 |
| JP | 2017188981 A | 10/2017 |
| JP | 2021158791 A | 10/2021 |
| WO | 2019082710 A1 | 5/2019 |
| WO | 2021192654 A1 | 9/2021 |

OTHER PUBLICATIONS

Office Action from the Japanese Patent Office dispatched Jan. 9, 2024, in related Japanese application No. 2019-165542, and machine translation thereof.
English translation of the Written Opinion of the International Searching Authority for parent application No. PCT/JP2020/024241.
English translation the International Search Report dated Aug. 25, 2020, for parent application No. PCT/JP2020/024241.
Office Action from the Chinese Patent Office dispatched Apr. 17, 2024 in related CN application No. 202080056452.5, and translation thereof.

* cited by examiner

ELECTRIC WORK MACHINE

CROSS-REFERENCE

This application is the US national stage of International Patent Application No. PCT/JP2020/024241 filed on Jun. 19, 2020, which claims priority to Japanese Patent Application No. 2019-165542 filed on Sep. 11, 2019.

TECHNICAL FIELD

The present disclosure relates to an electric work machine.

BACKGROUND ART

In the technical field pertaining to electric work machines, a power tool having a brushless motor is known, as disclosed in Patent Document 1.

PRIOR ART LITERATURE

Patent Documents

Patent Document 1
Japanese Laid-open Patent Publication 2015-056953

SUMMARY OF THE INVENTION

There is a demand to make electric work machines compact. To make an electric work machine compact, it is necessary to make the motor compact.

An object of the present disclosure is to make an electric work machine compact.

According to the present disclosure, an electric work machine is provided that comprises: a motor having a stator and a rotor, which is disposed in an interior of the stator and is rotatable about a rotational axis; and an output shaft, on which a tool accessory is mounted and which is driven using motive power transmitted from the motor; wherein the stator has: a stator core; a coil, which is wound on at least a portion of the stator core; and a fusing terminal, which is disposed more inward in a radial direction than the coil and is connected to the coil.

According to the present disclosure, compactness of an electric work machine can be achieved.

DETAILED DESCRIPTION

Embodiments according to the present disclosure will be explained below, with reference to the drawings, but the present disclosure is not limited thereto. Structural elements of the embodiments explained below can be combined where appropriate. In addition, there are also situations in which some of the structural elements are not used.

In the embodiments, the positional relationships among parts are explained using the terms left, right, front, rear, up, and down. These terms indicate relative position or direction, in which the center of an electric work machine serves as a reference. The electric work machine includes power tools having a motor.

In the embodiments, the direction parallel to a rotational axis AX of the motor is called the axial direction where appropriate, the radial direction of the rotational axis AX of the motor is called the radial direction where appropriate, and the direction that goes around the rotational axis AX of the motor is called the circumferential direction or the rotational direction where appropriate. In addition, with regard to the radial direction, a direction that is located close to or approaches the rotational axis AX of the motor is called inward in the radial direction where appropriate, and a direction that is located far from or leads away from the rotational axis AX of the motor is called outward in the radial direction where appropriate.

[Power Tool]

Figure 1:
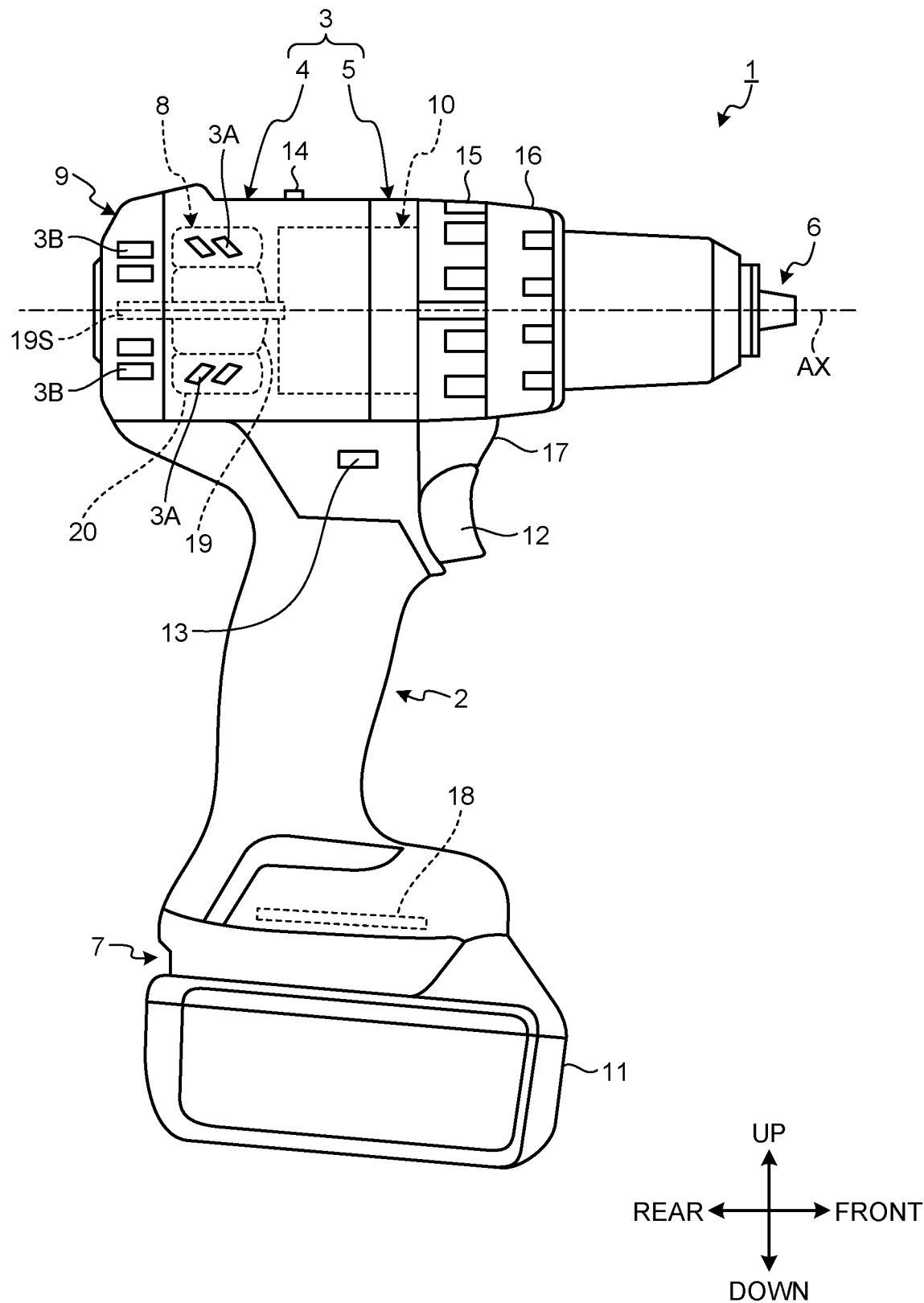
FIG. 1 is a side view that shows a power tool according to an embodiment.

FIG. 1 is a side view that shows a power tool 1 according to the embodiment. In the embodiment, the power tool 1 is a hammer driver-drill. As shown in FIG. 1, the power tool 1 comprises: a grip housing 2; a main-body housing 3, which is disposed upward of the grip housing 2 and houses a motor 8 and a power-transmission mechanism 10; an output shaft 6, which protrudes forward from the main-body housing 3; and a battery-mounting part 7, which is disposed at a lower portion of the grip housing 2.

The grip housing 2 is gripped by a user. The grip housing 2 protrudes downward from the lower portion of the main-body housing 3. The grip housing 2 is made of a synthetic resin.

The main-body housing 3 comprises a motor housing 4 and a gear housing 5, which is disposed forward of the motor housing 4. The output shaft 6 protrudes forward from the gear housing 5.

The motor housing 4 houses the motor 8. The motor housing 4 has a tube shape. The motor 8 is disposed in an interior space of the motor housing 4. The motor housing 4 is integral with the grip housing 2. The motor housing 4 is made of a synthetic resin. A rear cover 9 is disposed on a rear portion of the motor housing 4. The rear cover 9 covers an opening of the rear portion of the motor housing 4. The rear cover 9 is made of a synthetic resin.

The motor housing 4 has air-suction ports 3A. The rear cover 9 has air-exhaust ports 3B. The air-exhaust ports 3B are provided rearward of the air-suction ports 3A. The air-suction ports 3A connect the interior space and the exterior space of the main-body housing 3. The air-exhaust ports 3B connect the interior space and the exterior space of the main-body housing 3. The air-suction ports 3A are provided in both a left portion and a right portion of the motor housing 4. The air-exhaust ports 3B are provided in both a left portion and a right portion of the rear cover 9. Air in the exterior space of the main-body housing 3 flows into the interior space of the main-body housing 3 via the air-suction ports 3A. The air in the interior space of the main-body housing 3 flows out to the exterior space of the main-body housing 3 via the air-exhaust ports 3B.

The gear housing 5 houses the power-transmission mechanism 10, which comprises a plurality of gears. The gear housing 5 has a tube shape. The power-transmission mechanism 10 is disposed in the interior space of the gear housing 5. The gear housing 5 is made of aluminum.

A tool accessory is mountable on the output shaft 6. The tool accessory, such as a drill, is mounted on the output shaft 6. The output shaft 6 comprises: a spindle, which rotates owing to the power generated by the motor 8; and a chuck, which is capable of holding the tool accessory.

The battery-mounting part 7 is connected to a battery pack 11. The battery-mounting part 7 is provided at a lower portion of the grip housing 2. The battery pack 11 is mountable on the battery-mounting part 7 in a detachable manner. The battery pack 11 comprises a secondary battery. In the embodiment, the battery pack 11 comprises a rechargeable-type lithium-ion battery. By being mounted on the battery-mounting part 7, the battery pack 11 can supply electric power to the power tool 1.

The motor 8 generates motive power for driving the output shaft 6. The motor 8 operates using electric power supplied from the battery pack 11. The power-transmission mechanism 10 transmits, to the output shaft 6, the motive power generated by the motor 8. The output shaft 6 operates using the motive power transmitted from the motor 8 via the power-transmission mechanism 10.

The power tool 1 comprises a trigger switch 12, a forward/reverse-change lever 13, a speed-change lever 14, a mode-change ring 15, a change ring 16, a light 17, and a controller 18.

The trigger switch 12 is disposed on the grip housing 2. The trigger switch 12 protrudes forward from an upper portion of a front portion of the grip housing 2. The trigger switch 12 is manipulated by the user. The user can manipulate the trigger switch 12 with a finger in the state in which the user grips the grip housing 2 with either the left or right hand. By manipulating the trigger switch 12, electric power is supplied from the battery pack 11 to the motor 8, and thereby the motor 8 operates. By manipulating the trigger switch 12, the motor 8 switches between operating and stopped.

The forward/reverse-change lever 13 is provided on an upper portion of the grip housing 2. The forward/reverse-change lever 13 is manipulated by the user. By manipulating the forward/reverse-changing lever 13, the rotational direction of the motor 8 changes. The user can manipulate the forward/reverse-changing lever 13 to change the rotational direction of the motor 8 from one of the forward-rotational direction and the reverse-rotational direction to the other. By changing the rotational direction of the motor 8, the rotational direction of the output shaft 6 changes.

The speed-change lever 14 is provided on an upper portion of the main-body housing 3. The speed-changing lever 14 is manipulated by the user. By manipulating the speed-changing lever 14, the rotational speed of the output shaft 6 changes. The user can operate the speed-changing lever 14 to change the rotational speed of the output shaft 6 from one of a first speed and a second speed, which is higher than the first speed, to the other.

The mode-change ring 15 is disposed forward of the gear housing 5. The mode-change ring 15 is manipulated by the user. By manipulating the mode-change ring 15, the action mode of the power tool 1 changes.

The action modes of the power tool 1 include: a hammer mode, in which the output shaft 6 hammers in a front-rear direction; and a non-hammer mode, in which the output shaft 6 does not hammer in the front-rear direction. The non-hammer mode includes a drill mode, in which power is transmitted to the output shaft 6 regardless of the rotational load that is acting on the output shaft 6; and a clutch mode, in which the power transmitted to the output shaft 6 is cut off based on the rotational load that is acting on the output shaft 6.

The change ring 16 is disposed forward of the mode-change ring 15. The change ring 16 is manipulated by the user. In the clutch mode, by manipulating the change ring 16, the release value, at which power transmitted to the output shaft 6 is cut off, is set. The release value is a value related to the rotational load that is acting on the output shaft 6. When the rotational load that is acting on the output shaft 6 has reached the release value, power transmitted to the output shaft 6 is cut off.

The light 17 is provided on an upper portion of a front portion of the grip housing 2. The light 17 emits illumination light, which illuminates forward of the power tool 1. The light 17 comprises, for example, a light-emitting diode (LED: light-emitting diode).

The controller 18 outputs control signals, which control the power tool 1. The controller 18 controls the drive currents supplied to the motor 8. The controller 18 is housed in the grip housing 2. The controller 18 is disposed in a lower portion of the interior space of the grip housing 2.

[Motor]

The motor 8 is a brushless motor. The motor 8 is an inner-rotor-type motor comprising a stator 20, which has a tube shape, and a rotor 19, which is disposed in the interior of the stator 20. The rotor 19 comprises a rotor shaft 19S, which extends in the axial direction. The rotor 19 is rotatable about the rotational axis AX.

[Overall Structure of Stator]

Figure 2:
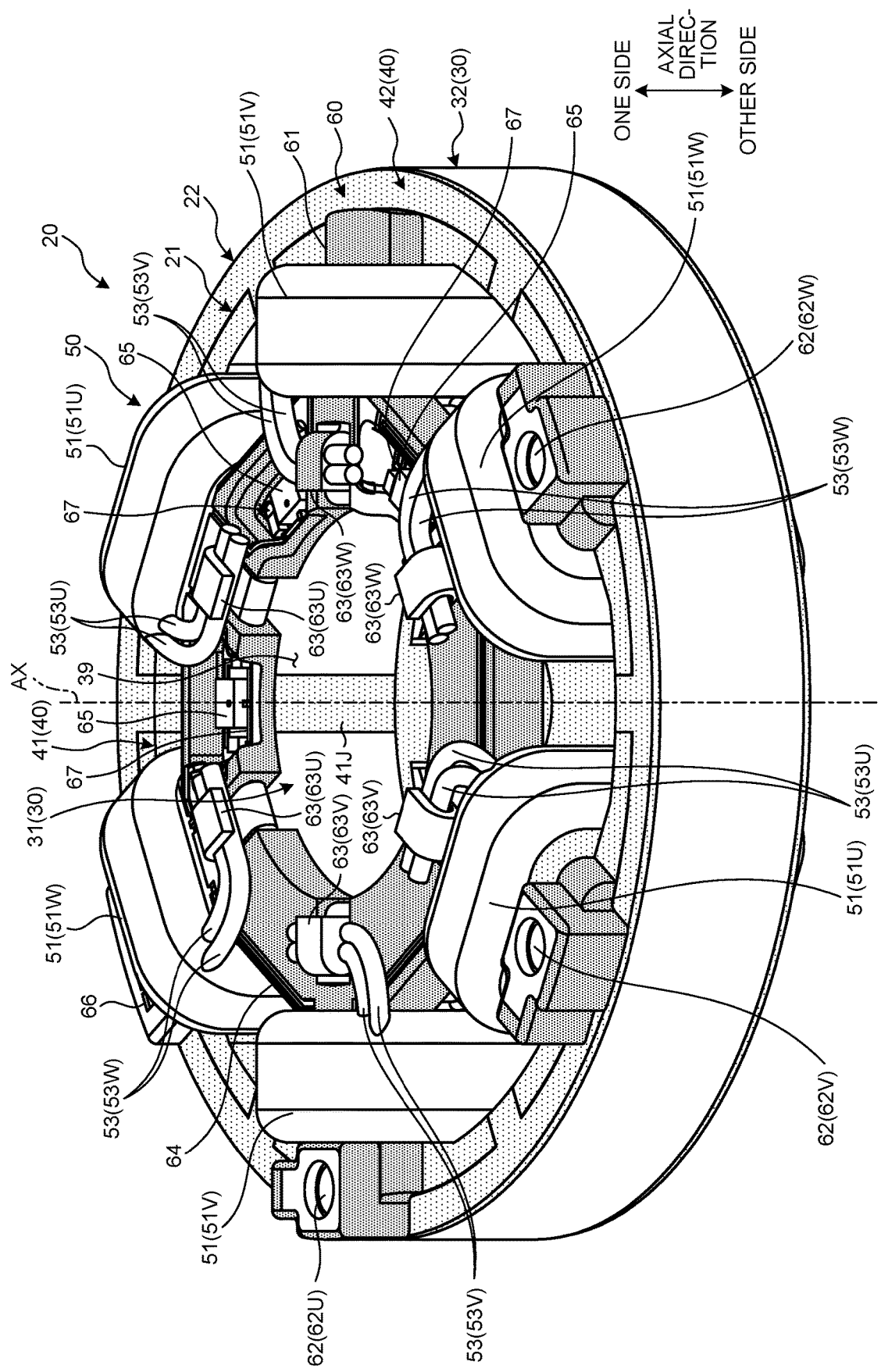
FIG. 2 is an oblique view that shows, from one side in the axial direction, a stator according to the embodiment.
Figure 3:
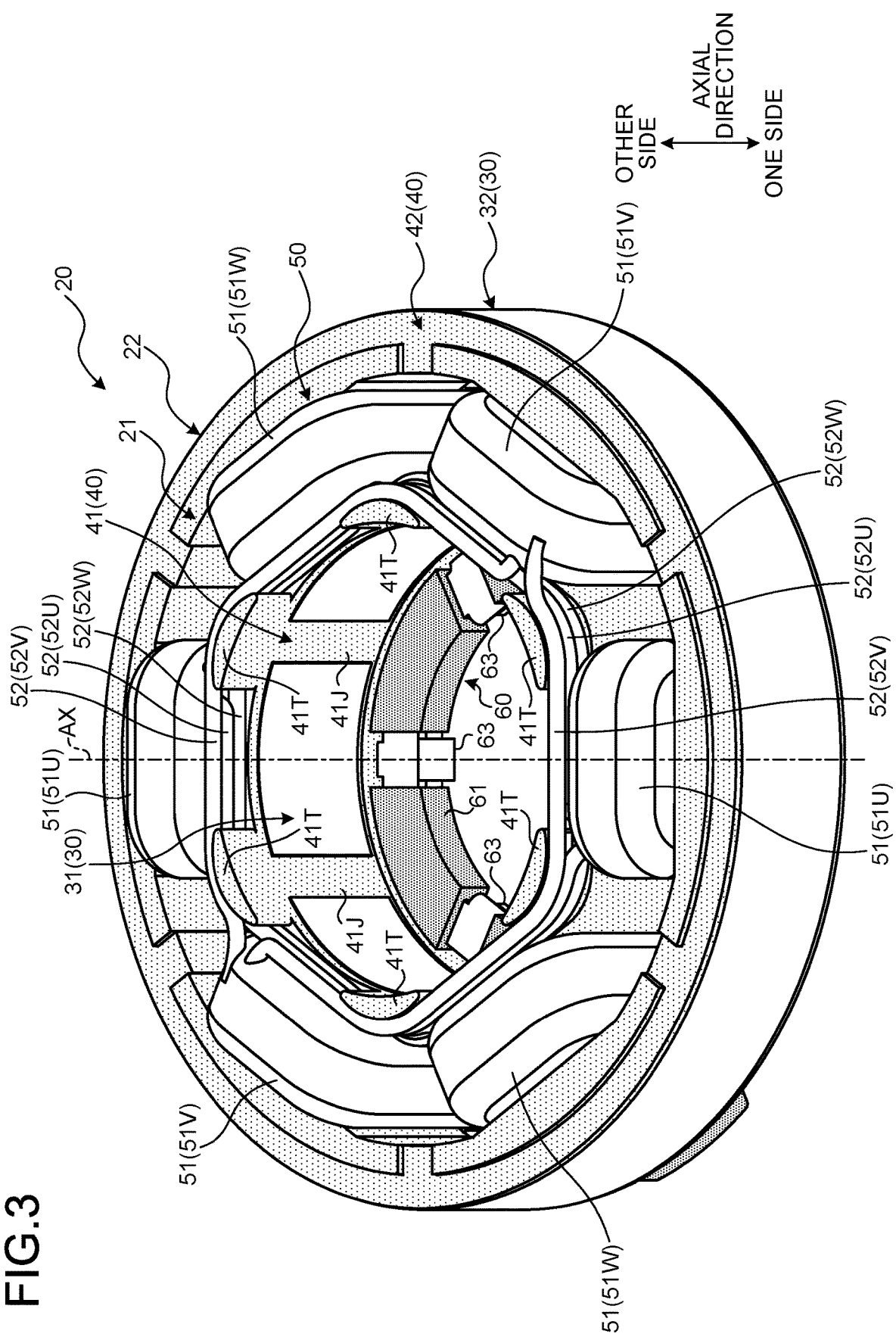
FIG. 3 is an oblique view that shows, from the other side in the axial direction, a stator according to the embodiment.
Figure 4:
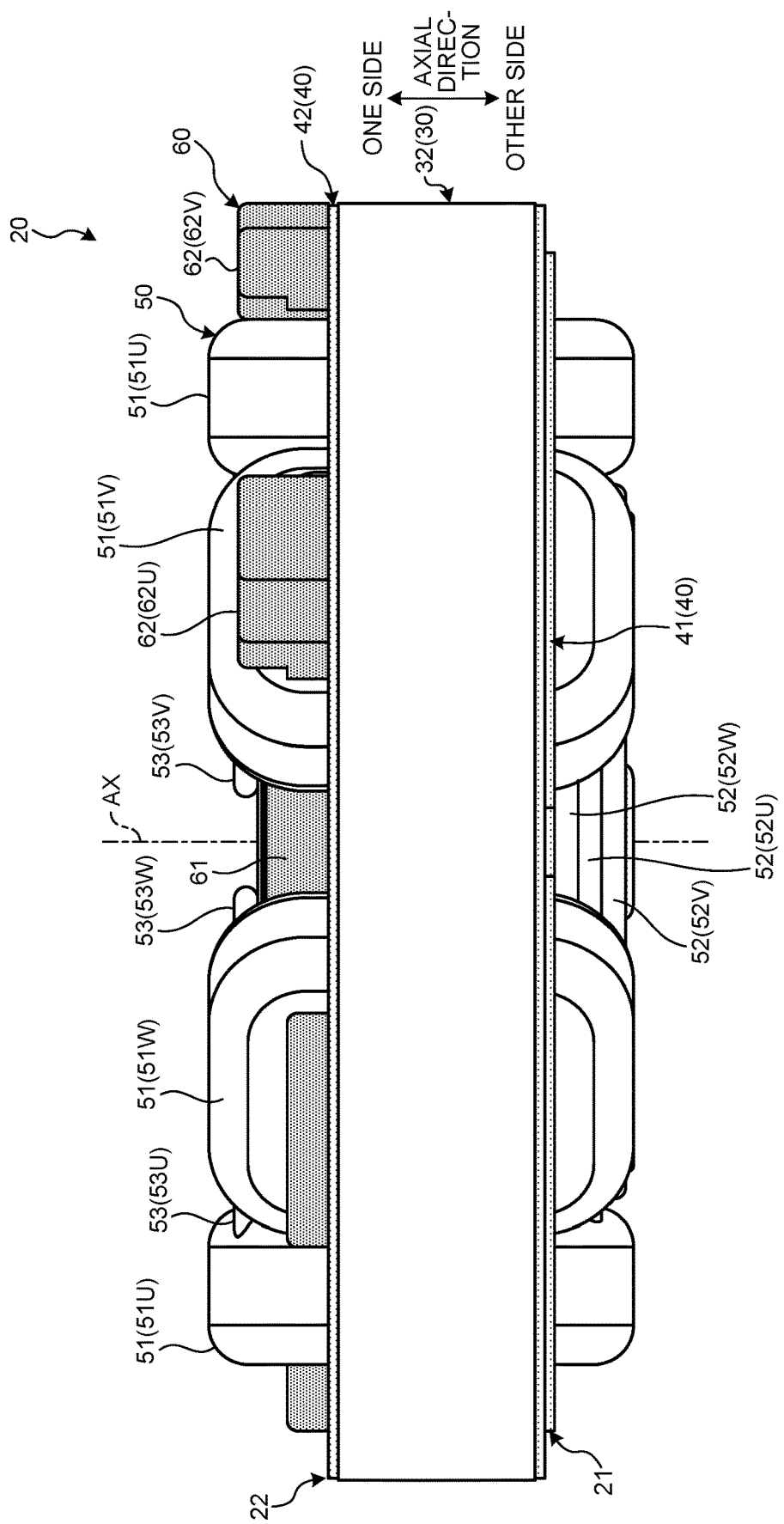
FIG. 4 is a side view that shows the stator according to the embodiment.
Figure 5:
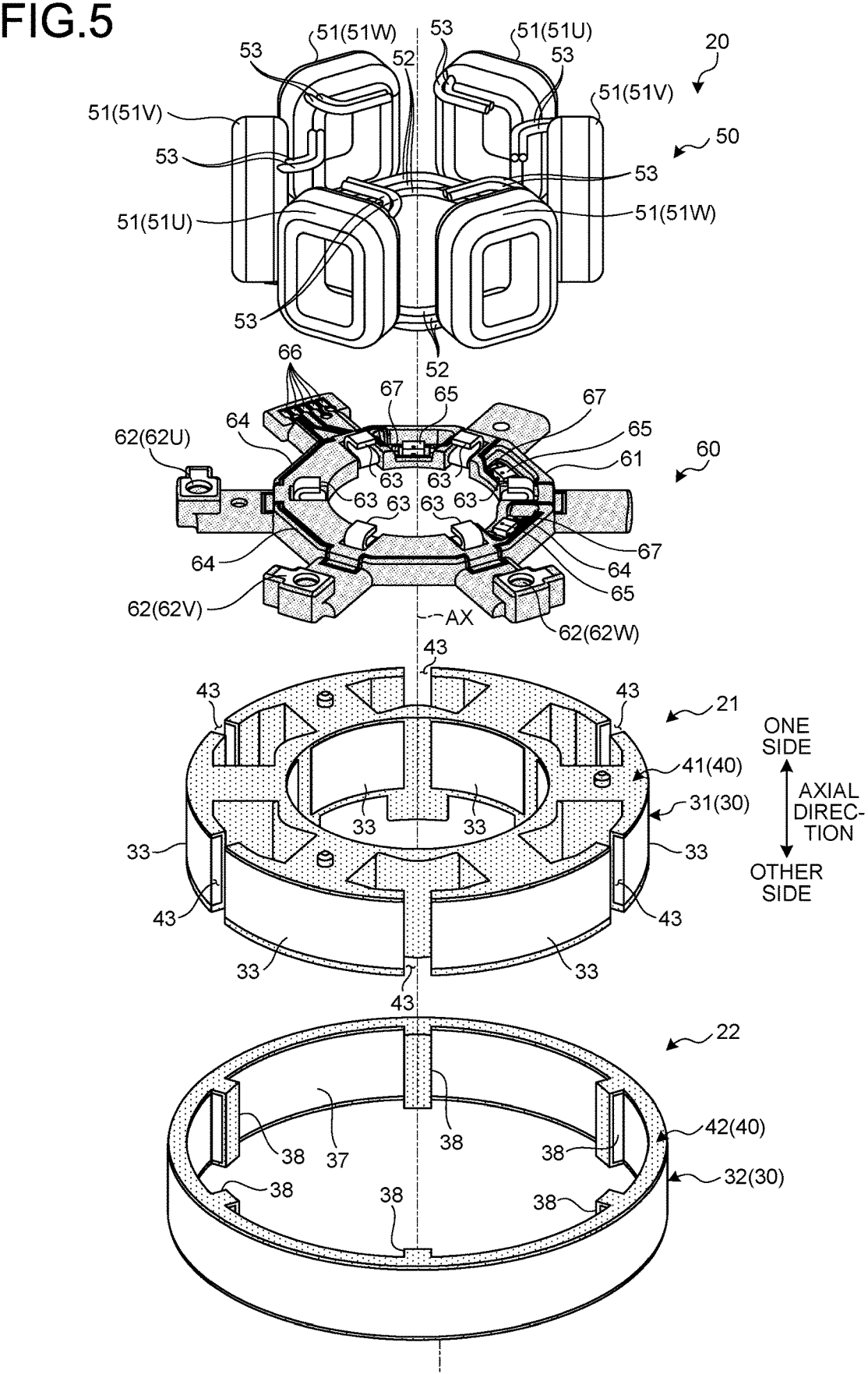
FIG. 5 is an exploded, oblique view that shows the stator according to the embodiment.

FIG. 2 is an oblique view that shows the stator 20, from one side in the axial direction, according to the embodiment. FIG. 3 is an oblique view that shows the stator 20, from the other side in the axial direction, according to the embodiment. FIG. 4 is a side view that shows the stator 20 according to the embodiment. FIG. 5 is an exploded, oblique view that shows the stator 20 according to the embodiment.

As shown in FIG. 2, FIG. 3, FIG. 4, and FIG. 5, the stator 20 comprises a stator core 30, an insulator 40, a coil unit 50, and a terminal unit 60.

The stator core 30 is made of a metal whose main component is iron. The stator core 30 comprises an interior core 31 and an exterior core (annular yoke) 32, which is disposed around the interior core 31.

The insulator 40 is disposed such that it covers at least a portion of the surfaces of the stator core 30. The insulator 40 is made of an insulating material. The insulator 40 is made of a synthetic resin. The insulator 40 comprises an interior insulator 41, which covers at least a portion of the surfaces of the interior core 31, and an exterior insulator 42, which covers at least a portion of the surfaces of the exterior core 32.

In the embodiment, the interior core 31 and the interior insulator 41 are collectively called an interior member 21 where appropriate. In addition, the exterior core 32 and the exterior insulator 42 are collectively called an exterior member 22 where appropriate.

The coil unit 50 comprises a plurality of coils 51 and crossover wires 52, each of which connects one of the coils 51 with another one of the coils 51. The coil unit 50 is formed of wires (electrical connection portions) 53 made of metal.

The coils 51 are wound through the insulator 40 and on at least a portion of the stator core 30. In the embodiment, the coils 51 are wound around at least a portion of the interior member 21.

Six of the coils 51 are provided. The coils 51 are formed by winding the wires 53. The crossover wires 52 refer to the wires 53 when they are between one of the coils 51 and another one of the coils 51. In the axial direction, the crossover wires 52 are disposed between the centers and the other-side end portions of the coils 51. That is, the crossover wires 52 are disposed at locations proximate to the end portions of the coils 51 on the other side in the axial direction. The crossover wires 52 do not protrude beyond the coils 51 on the other side in the axial direction.

The terminal unit 60 connects the coils 51 and a power-supply unit. The power-supply unit is disposed at an outer portion of the motor 8. The power-supply unit supplies the drive currents to the motor 8. The power-supply unit comprises the battery pack 11. The controller 18 controls the drive currents that are supplied from the power-supply unit to the motor 8. The drive currents include a U-phase drive current, a V-phase drive current, and a W-phase drive current. The drive currents from the power-supply unit are supplied to the terminal unit 60.

In the axial direction, the terminal unit 60 is disposed between the centers and the one-side end portions of the coils 51. That is, the terminal unit 60 is disposed at a location proximate to end portions of the coils 51 on the one side in the axial direction. The terminal unit 60 does not protrude beyond the coils 51 on the one side in the axial direction.

The terminal unit 60 comprises: a support member 61, which is made of an insulating material; exterior terminals 62, which are connected to the power-supply unit via cables (not shown); fusing terminals (interior terminals) 63, which are connected to the coils 51; short-circuiting members 64, which connect the exterior terminals 62 and the fusing terminals 63; a plurality of rotation-detection devices 65, which detects the rotation of the rotor 19; signal terminals 66, from which detection signals of the rotation-detection devices 65 are output; and signal lines 67, which connect the rotation-detection devices 65 and the signal terminals 66.

The support member 61 is made of a synthetic resin. The support member 61 supports the exterior terminals 62, the fusing terminals 63, the short-circuiting members 64, the rotation-detection devices 65, the signal terminals 66, and the signal lines 67.

In the axial direction, the support member 61 is disposed between the centers and the one-side end portions of the coils 51. The support member 61 does not protrude beyond the coils 51 on the one side in the axial direction.

At least a portion of the support member 61 is disposed more inward in the radial direction than the coils 51. At least a portion of the support member 61 is disposed more inward in the radial direction than an inner surface 39 of the stator core 30. The inner surface 39 of the stator core 30 opposes the rotor 19.

At least a portion of the support member 61 is disposed more outward in the radial direction than the coils 51.

At least portions of the support member 61 are disposed in the interiors of the coils 51. The coils 51 are disposed such that they are wound around at least portions of the support member 61. The support member 61 is disposed on the one side in the axial direction of the stator core 30. The support member 61 is supported by the stator core 30 via the insulator 40. The coils 51 are disposed such that they are wound around the stator core 30 and the support member 61.

The exterior terminals 62 are disposed more outward in the radial direction than the coils 51. The exterior terminals 62 comprise: a U-phase, outer-part terminal 62U, through which the U-phase drive current is supplied; a V-phase, outer-part terminal 62V, through which the V-phase drive current is supplied; and a W-phase, outer-part terminal 62W, through which the W-phase drive current is supplied.

A plurality of the fusing terminals 63 is disposed around the rotational axis AX. The number of fusing terminals 63 provided is the same as the number of coils 51, and only that number is provided. In the embodiment, six of the fusing terminals 63 are provided. The locations of the fusing terminals 63 in the axial direction are the same.

The fusing terminals 63 are disposed more inward in the radial direction than the coils 51. The fusing terminals 63 are connected to the coils 51 via the wires 53, which protrude from the coils 51 inward in the radial direction.

At least a portion of each of the fusing terminals 63 is disposed more inward in the radial direction than the inner surface 39 of the stator core 30.

The short-circuiting members 64 connect the exterior terminals 62 and the fusing terminals 63. At least a portion of each of the short-circuiting members 64 is disposed more inward in the radial direction than the coils 51. At least a portion of each of the short-circuiting members 64 is disposed more outward in the radial direction than the coils 51. The short-circuiting members 64 connect pairs of the fusing terminals 63.

A portion of each of the short-circuiting members 64 is disposed in the interior of the support member 61. At least a portion of each of the signal lines 67 is disposed in the interior of the support member 61. The short-circuiting members 64 and the signal lines 67 are each molded using a synthetic resin. In the embodiment, the terminal unit 60 comprises a molded interconnect device (MID: molded interconnect device).

<Interior Member>

Figure 6:
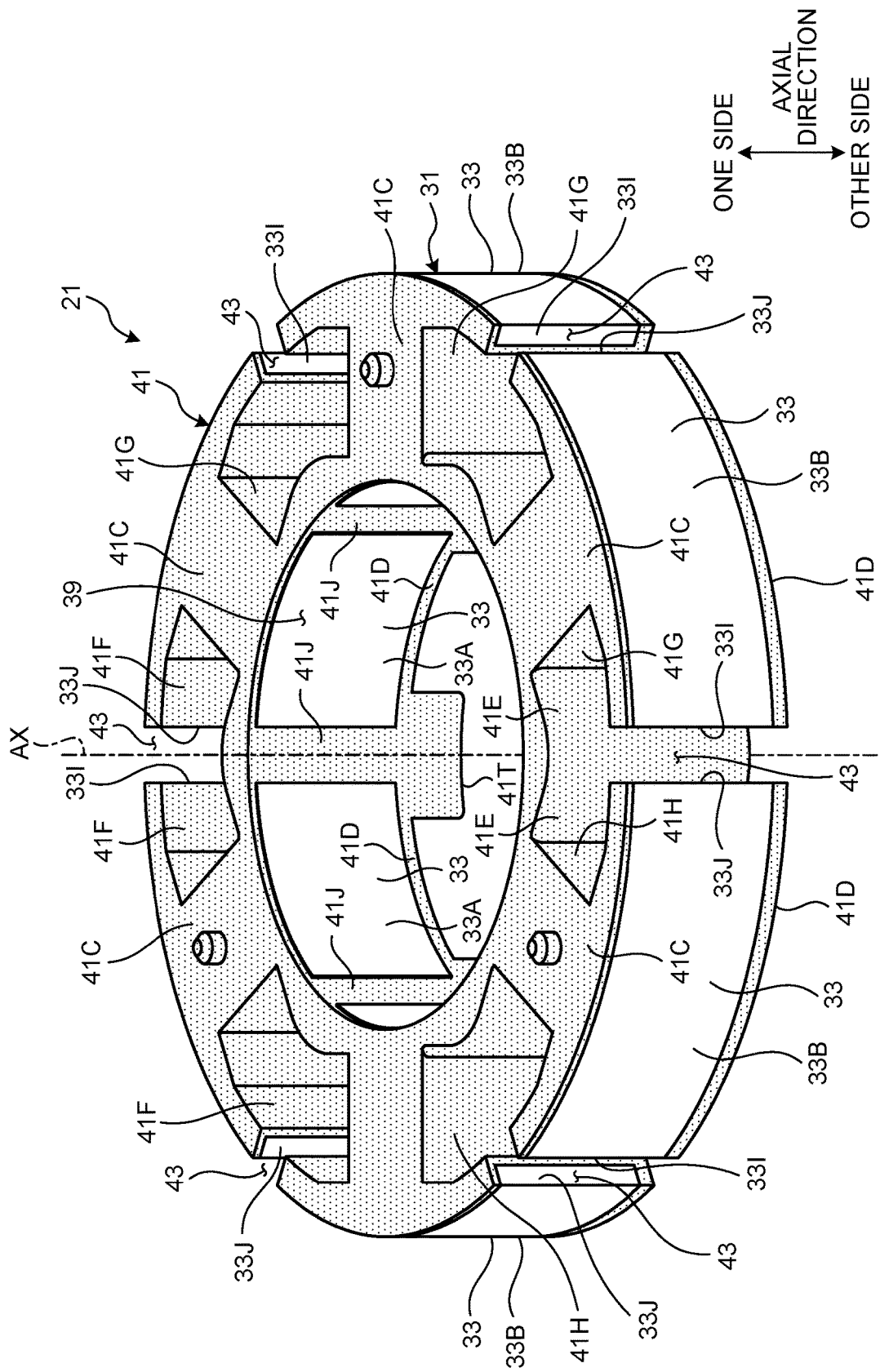
FIG. 6 is an oblique view that shows an interior member according to the embodiment.
Figure 7:
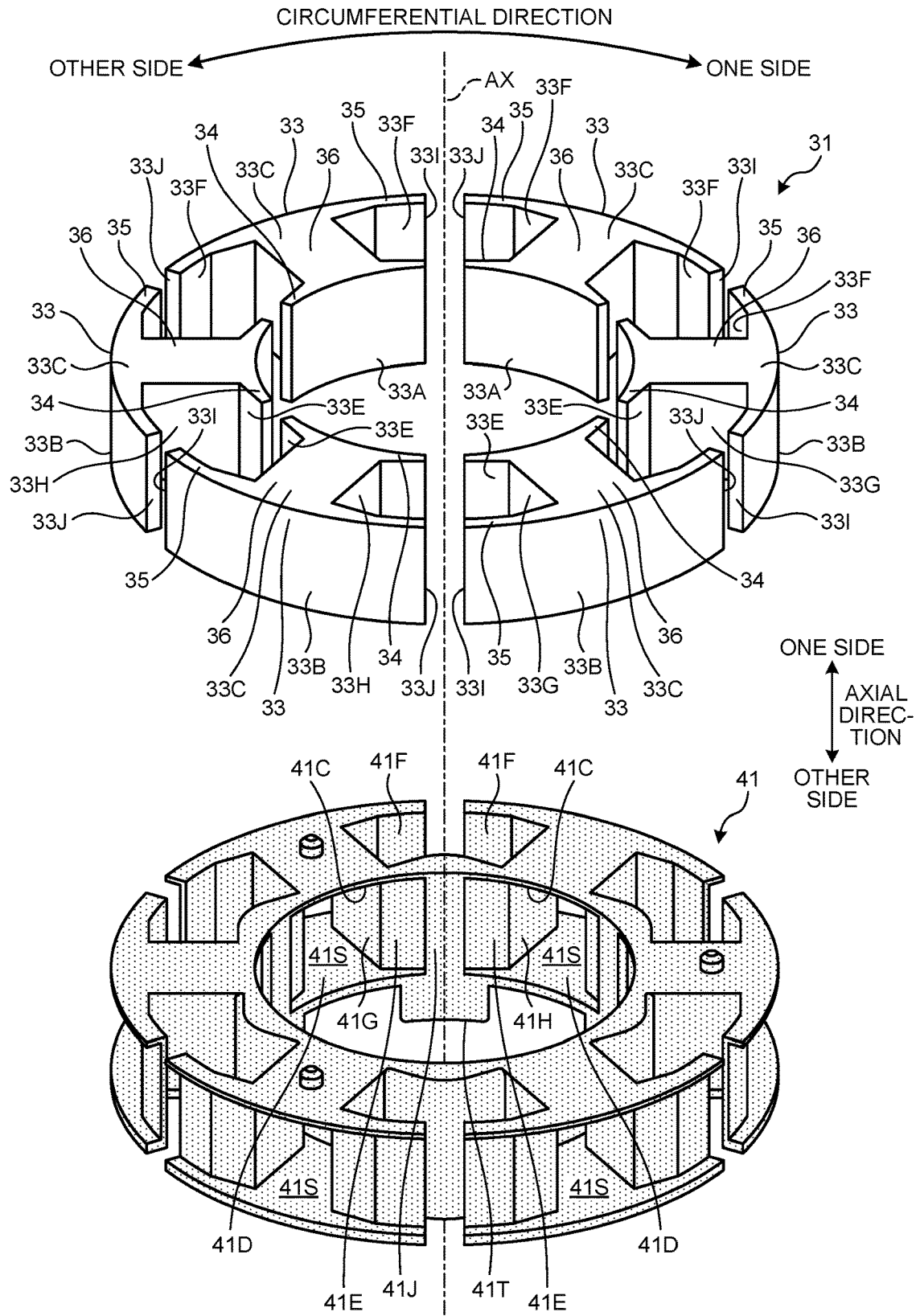
FIG. 7 is an exploded, oblique view that shows the interior member according to the embodiment.

FIG. 6 is an oblique view that shows the interior member 21 according to the embodiment. FIG. 7 is an exploded, oblique view that shows the interior member 21 according to the embodiment. As shown in FIG. 6 and FIG. 7, the interior member 21 comprises the interior core 31 and the interior insulator 41, which covers at least a portion of the surfaces of the interior core 31.

The interior core 31 comprises a plurality of core segments 33. The shapes of the core segments 33 are identical, and the dimensions of the core segments 33 are identical. The core segments 33 are disposed equispaced in the circumferential direction. In the embodiment, the interior core 31 comprises six of the core segments 33. The core segments 33 are disposed spaced apart by 60 [°] in the circumferential direction.

Figure 8:
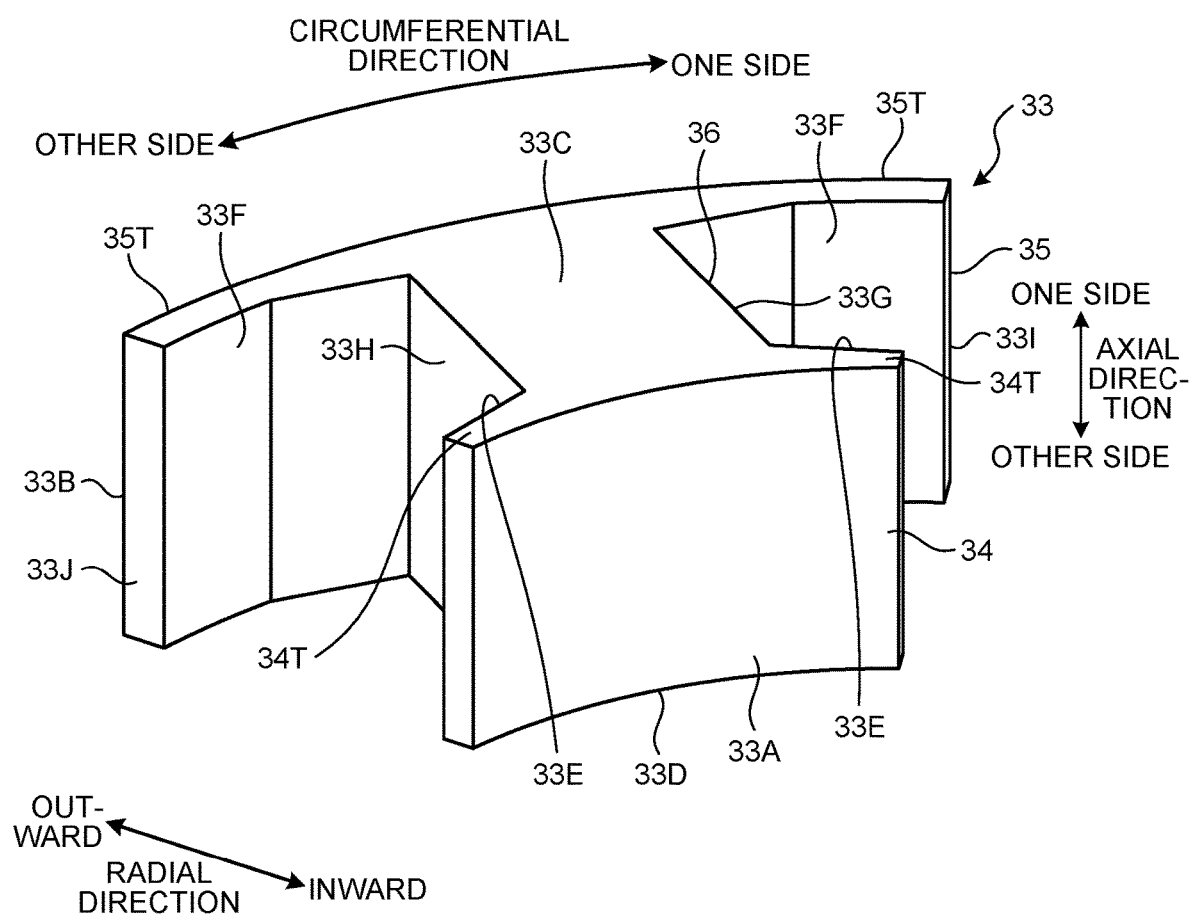
FIG. 8 is an oblique view that shows a core segment according to the embodiment.

FIG. 8 is an oblique view that shows a core segment 33 according to the embodiment. As shown in FIG. 6, FIG. 7, and FIG. 8, the core segments 33 comprise: an inner-wall part 34; an outer-wall part 35, which is disposed outward in the radial direction of the inner-wall part 34; and a tooth part (tooth) 36, which connects the inner-wall part 34 and the outer-wall part 35. The inner-wall part 34, the outer-wall part 35, and the tooth part 36 are integral. That is, the inner-wall part 34, the outer-wall part 35, and the tooth part 36 are a single member.

The core segments 33 comprise a plurality of steel sheets stacked in the axial direction. The steel sheets are sheets made of a metal whose main component is iron. By stacking the plurality of steel sheets, the core segments 33 are formed. The dimensions of the core segments 33 in the axial direction are constant.

The inner-wall parts 34 are disposed in parts around the rotational axis AX. The inner-wall parts 34 have a plate shape. The inner-wall parts 34 are connected to inner-end portions of the tooth parts 36 that are inward in the radial direction. The inner-wall parts 34 have an arcuate shape within a plane orthogonal to the rotational axis AX.

The tooth parts 36 protrude outward in the radial direction from the inner-wall parts 34. The tooth parts 36 have a block shape. The coils 51 are wound around the tooth parts 36.

The outer-wall parts 35 are disposed in parts around the rotational axis AX. The outer-wall parts 35 have a plate shape. The outer-wall parts 35 are connected to outer-end portions of the tooth parts (teeth) 36 that are outward in the radial direction. The outer-wall parts 35 have an arcuate shape within a plane orthogonal to the rotational axis AX.

In the circumferential direction, the dimension of the inner-wall parts 34 is larger than the dimension of the tooth parts 36. In the circumferential direction, the dimension of the outer-wall parts 35 is larger than the dimension of the inner-wall parts 34 and larger than the dimension of the tooth parts 36. In the circumferential direction, the locations of the centers of the inner-wall parts 34, the locations of the centers of the tooth part 36, and the locations of the center of the outer-wall parts 35 coincide. The inner-wall parts 34 include protruding parts 34T, which protrude from the inner-end portions of the tooth parts 36 on one side in the circumferential direction and on the other side in the circumferential direction. The outer-wall parts 35 include protruding parts 35T, which protrude from the outer-end portions of the tooth parts 36 on the one side in the circumferential direction and on the other side in the circumferential direction.

The surfaces of the core segments 33 include: an inner surface 33A, which faces inward in the radial direction; an outer surface 33B, which faces outward in the radial direction; an end surface 33C, which faces the one side in the axial direction; and an end surface 33D, which faces the other side in the axial direction.

The inner surface 33A is disposed on the inner-wall part 34. The inner surface 33A opposes the rotor 19. The inner surface 33A has an arcuate shape within a plane orthogonal to the rotational axis AX. The inner surface 39 of the stator core 30 includes the inner surfaces 33A of the core segments 33.

The outer surface 33B is disposed on the outer-wall part 35. The outer surface 33B opposes the exterior member 22. The outer surface 33B has an arcuate shape within a plane orthogonal to the rotational axis AX.

The end surface 33C includes the end surface of the inner-wall part 34 on the one side in the axial direction, the end surface of the outer-wall part 35 on the one side in the axial direction, and the end surface of the tooth part 36 on the one side in the axial direction. The end surface of the inner-wall part 34 on the one side in the axial direction, the end surface of the outer-wall part 35 on the one side in the axial direction, and the end surface of the tooth part 36 on the one side in the axial direction are disposed within the same plane. The end surface 33C is orthogonal to the rotational axis AX.

The end surface 33D includes the end surface of the inner-wall part 34 on the other side in the axial direction, the end surface of the outer-wall part 35 on the other side in the axial direction, and the end surface of the tooth part 36 on the other side in the axial direction. The end surface of the inner-wall part 34 on the other side in the axial direction, the end surface of the outer-wall part 35 on the other side in the axial direction, and the end surface of the tooth part 36 on the other side in the axial direction are disposed within the same plane. The end surface 33D is orthogonal to the rotational axis AX.

In addition, the surfaces of the core segments 33 include: opposing surfaces 33E, which are disposed on the inner-wall part 34 and face outward in the radial direction; opposing surfaces 33F, which are disposed on the outer-wall part 35 and face inward in the radial direction; a side surface 33G, which is disposed on the tooth part 36 and faces the one side in the circumferential direction; a side surface 33H, which is disposed on the tooth part 36 and faces the other side in the circumferential direction; a side surface 33I, which is disposed on the outer-wall part 35 and faces the one side in the circumferential direction; and a side surface 33J, which is disposed on the outer-wall part 35 and faces the other side in the circumferential direction.

Figure 9:
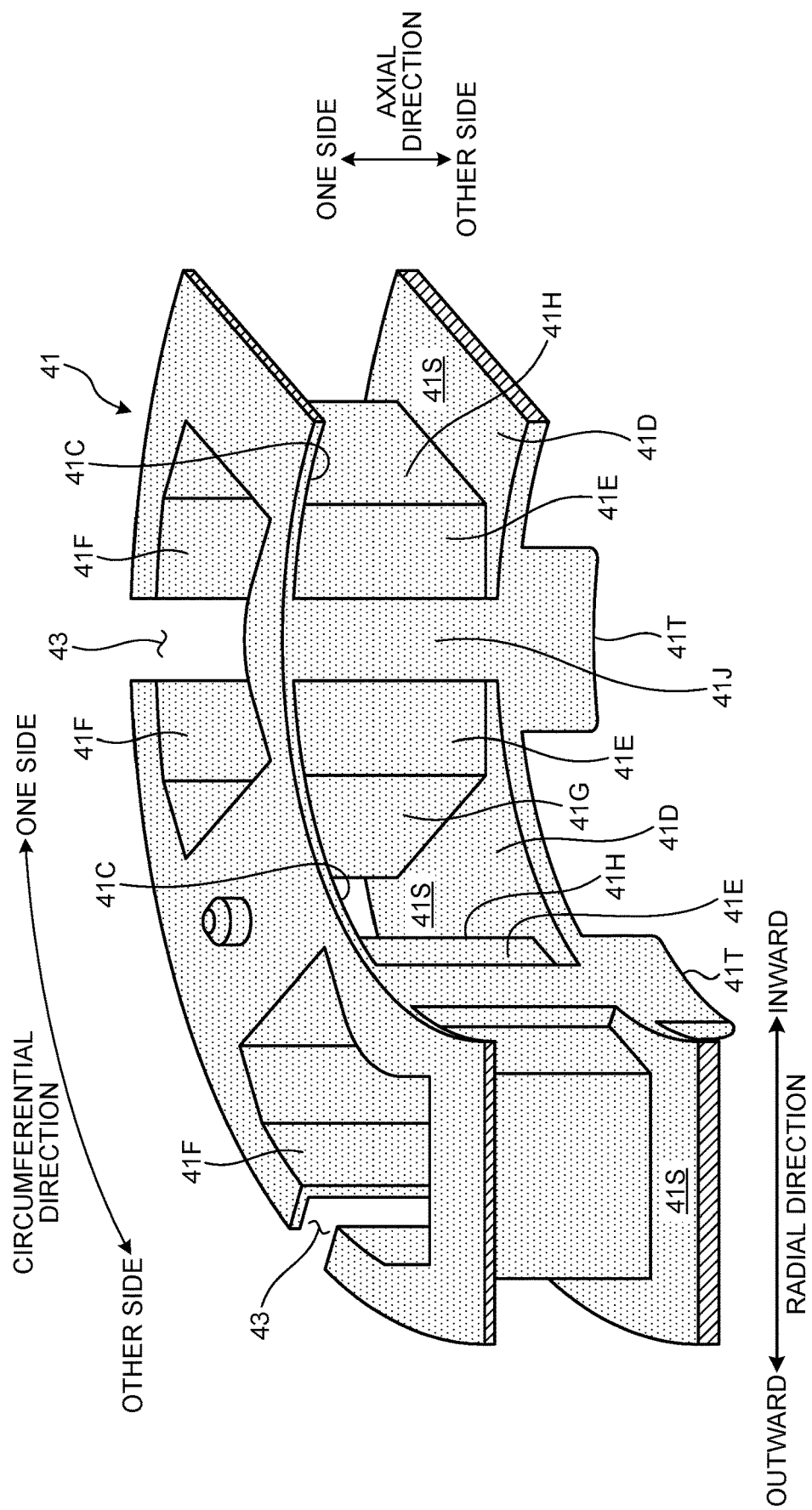
FIG. 9 is an oblique view that shows a portion of an interior insulator according to the embodiment.

FIG. 9 is an oblique view that shows a portion of the interior insulator 41 according to the embodiment. The interior insulator 41 is made of an insulating material. The interior insulator 41 is made of a synthetic resin. The interior insulator 41 is disposed such that it covers at least a portion of the surfaces of the core segments 33. The interior insulator 41 is formed integrally. The core segments 33 are coupled by the interior insulator 41.

As shown in FIG. 6, FIG. 7, and FIG. 9, the interior insulator 41 comprises: covering parts 41C, which cover the end surfaces 33C; covering parts 41D, which cover the end surfaces 33D; covering parts 41E, which cover the opposing surfaces 33E; covering parts 41F, which cover the opposing surfaces 33F; covering parts 41G, which cover the side surfaces 33G; and covering parts 41H, which cover the side surfaces 33H. The covering parts 41C, the covering parts 41D, the covering parts 41E, the covering parts 41F, the covering parts 41G, and the covering parts 41H are integral.

The covering parts 41C are disposed on the one side in the axial direction of the covering parts 41D. The covering parts 41C and the covering parts 41D oppose one another with a gap interposed therebetween. The covering parts 41G are disposed on the one side in the circumferential direction of the covering parts 41H. The covering parts 41G and the covering parts 41H oppose one another, with a gap interposed therebetween. The tooth parts 36 are disposed inward of spaces 41S, which are defined by the covering parts 41C, the covering parts 41D, the covering parts 41G, and the covering parts 41H.

The covering parts 41E are disposed such that they cover: the opposing surfaces 33E of the protruding parts 34T, which protrude on the one side in the circumferential direction from the inner-end portions of the tooth parts 36; and the opposing surfaces 33E of the protruding parts 34T, which protrude on the other side in the circumferential direction from the inner-end portions of the tooth parts 36.

The covering parts 41F are disposed such that they cover: the opposing surfaces 33F of the protruding parts 35T, which protrude on the one side in the circumferential direction from the outer-end portions of the tooth parts 36; and the opposing surfaces 33F of the protruding parts 35T, which protrude on the other side in the circumferential direction from the outer-end portions of the tooth parts 36.

In addition, the interior insulator 41 comprises coupling parts 41J. The coupling parts 41J extend in the axial direction. The coupling parts 41J are disposed such that they couple the end portions of the covering parts 41C inward in the radial direction and the end portions of the covering parts 41D inward in the radial direction. Six of the coupling parts 41J are disposed spaced apart in the circumferential direction. The coupling parts 41J are disposed between the core segments 33 that are adjacent to one another in the circumferential direction. Inner surfaces of the coupling parts 41J oppose the rotor 19. The inner surfaces of the coupling parts 41J are disposed between the inner surfaces 33A that are adjacent to one another in the circumferential direction. The inner surface 39 of the stator core 30 includes the inner surfaces of the core segments 33 and the inner surfaces of the coupling parts 41J.

As shown in FIG. 6, a gap 43 is provided between the side surface 33I of a first core segment 33 and the side surface 33J of a second core segment 33 that is adjacent to the first core segment 33. The gap 43 is provided between the covering part 41F that covers the opposing surface 33F of the first core segment 33 and the covering part 41F that covers the opposing surface 33F of the second core segment 33. The gap 43 is provided between the end portion outward in the radial direction of the covering part 41C that covers the end surface 33C of the first core segment 33 and the end portion outward in the radial direction of the covering part 41C that covers the end surface 33C of the second core segment 33. The gap 43 is provided between the end portion outward in the radial direction of the covering part 41D that covers the end surface 33D of the first core segment 33 and the end portion outward in the radial direction of the covering part 41D that covers the end surface 33D of the second core segment 33.

The interior insulator 41 is not disposed on the inner surfaces 33A, the outer surfaces 33B, the side surfaces 33I, and the side surfaces 33J of the core segments 33. The inner surfaces 33A, the outer surfaces 33B, the side surfaces 33I, and the side surfaces 33J include the surfaces of the steel sheets (a metal whose main component is iron).

The interior insulator 41 comprises protruding parts 41T, which protrude on the other side in the radial direction from the covering parts 41D. The locations of the centers of the coupling parts 41J and the locations of the centers of the protruding parts 41T coincide in the circumferential direction. Six of the protruding parts 41T are provided spaced apart in the circumferential direction. The protruding parts 41T support the crossover wires 52.

<Exterior Member>

Figure 10:
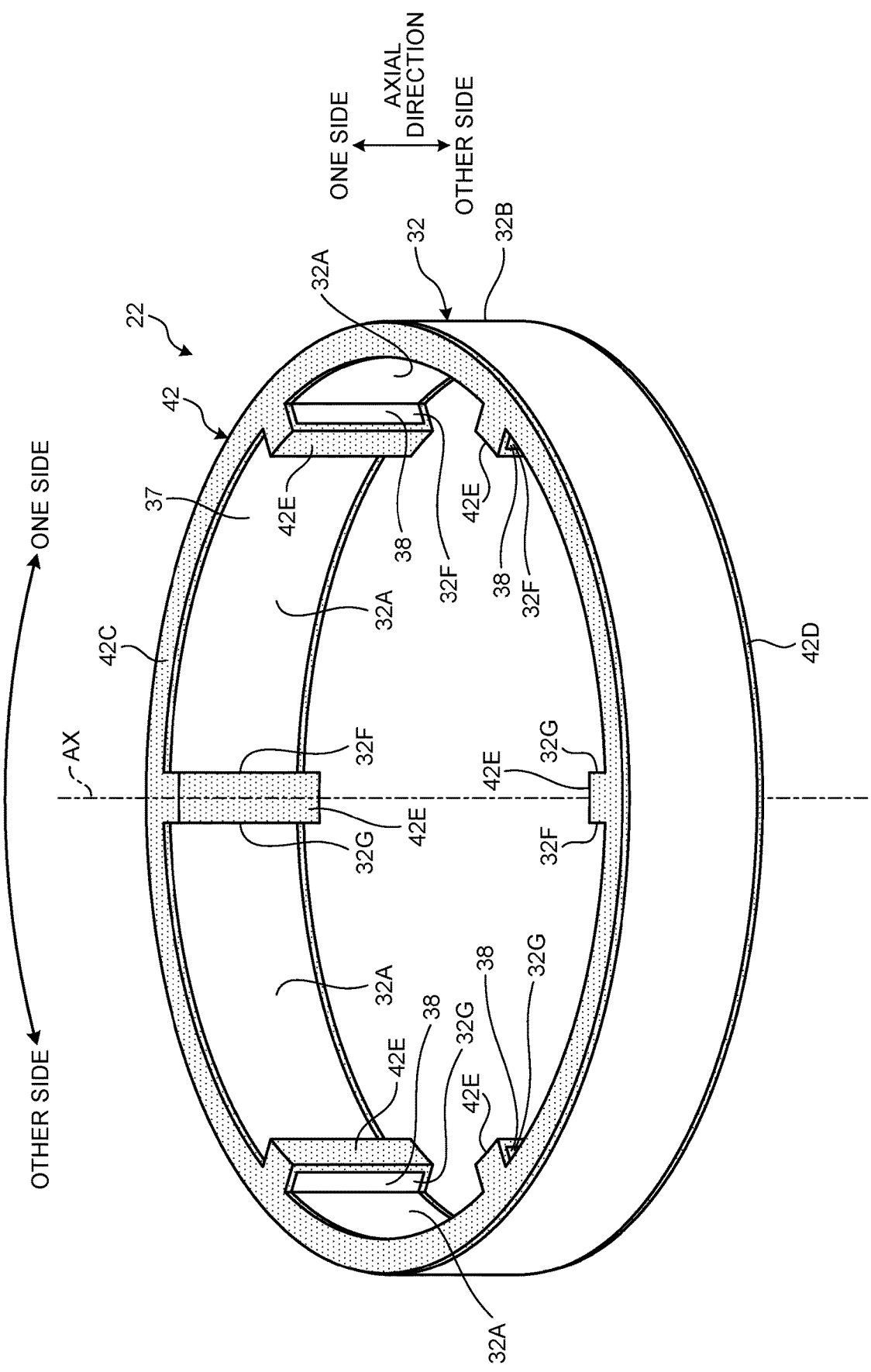
FIG. 10 is an oblique view that shows an exterior member according to the embodiment.
Figure 11:
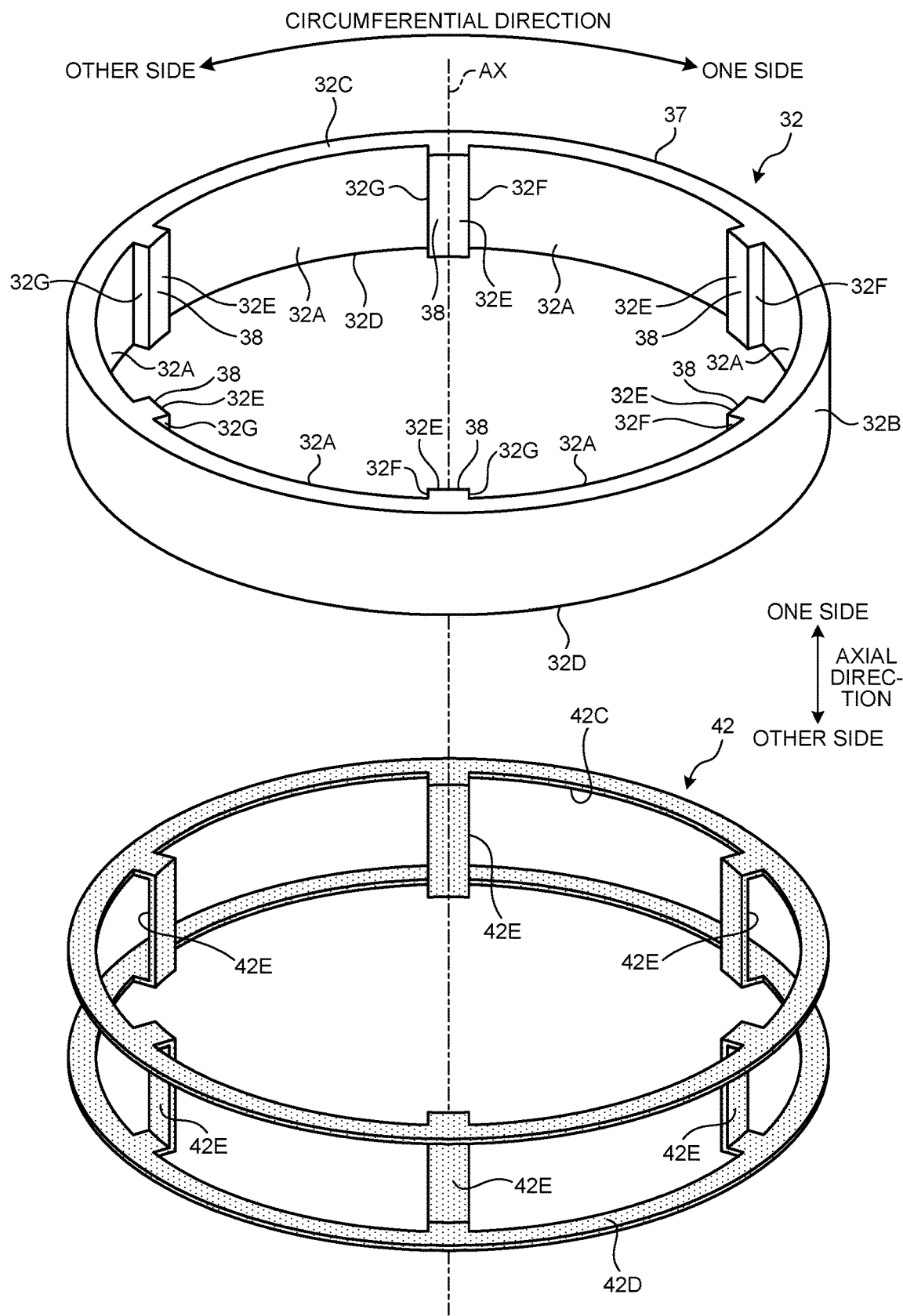
FIG. 11 is an exploded, oblique view that shows the exterior member according to the embodiment.

FIG. 10 is an oblique view that shows the exterior member 22 according to the embodiment. FIG. 11 is an exploded, oblique view that shows the exterior member 22 according to the embodiment. As shown in FIG. 10 and FIG. 11, the exterior member 22 comprises the exterior core 32 and the exterior insulator 42, which covers at least a portion of the surfaces of the exterior core 32.

The exterior core 32 comprises a plurality of steel sheets stacked in the axial direction. The steel sheets are sheets made of a metal whose main component is iron. By stacking the plurality of steel sheets, the exterior core 32 is formed. The exterior core 32 is disposed around the rotational axis AX. The exterior core 32 has a tube shape.

The exterior core 32 comprises a circular-tube part 37 and a plurality of protruding parts 38. The circular-tube part 37 has a circular-tube shape. The circular-tube part 37 is disposed around the rotational axis AX. Each of the protruding parts 38 of the plurality of protruding parts 38 protrudes inward in the radial direction from the inner surface of the circular-tube part 37. The plurality of protruding parts 38 is disposed such that the protruding parts 38 are spaced apart in the circumferential direction. In the embodiment, the protruding parts 38 are disposed equispaced in the circumferential direction. Six of the protruding parts 38 are provided. The protruding parts 38 are disposed spaced apart by 60 [°] in the circumferential direction. The circular-tube part 37 and the protruding parts 38 are integral. That is, the circular-tube part 37 and the protruding parts 38 are a single member. The dimensions of the exterior core 32 in the axial direction are constant.

The surfaces of the exterior core 32 include: inner surfaces 32A, which face inward in the radial direction; an outer surface 32B, which faces outward in the radial direction; an end surface 32C, which faces the one side in the axial direction; and an end surface 32D, which faces the other side in the axial direction.

The inner surfaces 32A are disposed on the circular-tube part 37. The inner surfaces 32A include the inner surface of the circular-tube part 37. The inner surfaces 32A oppose the interior member 21. The inner surfaces 32A have an arcuate shape within a plane orthogonal to the rotational axis AX.

The outer surface 32B is disposed on the circular-tube part 37. The outer surface 32B includes an outer surface of the circular-tube part 37. The outer surface 32B has an arcuate shape within a plane orthogonal to the rotational axis AX.

The end surface 32C includes the end surface of the circular-tube part 37 on the one side in the axial direction and the end surfaces of the protruding parts 38 on the one side in the axial direction. The end surface of the circular-tube part 37 on the one side in the axial direction and the end surfaces of the protruding parts 38 on the one side in the axial direction are disposed within the same plane. The end surface 32C is orthogonal to the rotational axis AX.

The end surface 32D includes the end surface of the circular-tube part 37 on the other side in the axial direction and the end surfaces of the protruding parts 38 on the other side in the axial direction. The end surface of the circular-tube part 37 on the other side in the axial direction and the end surfaces of the protruding parts 38 on the other side in the axial direction are disposed within the same plane. The end surface 32D is orthogonal to the rotational axis AX.

In addition, the surfaces of the exterior core 32 include: inner surfaces 32E, which are disposed on the protruding parts 38 and face inward in the radial direction; side surfaces 32F, which are disposed on the protruding parts 38 and face the one side in the circumferential direction; and side surfaces 32G, which are disposed on the protruding parts 38 and face the other side in the circumferential direction.

The exterior insulator 42 is made of an insulating material. The exterior insulator 42 is made of a synthetic resin. The exterior insulator 42 is disposed such that it covers at least a portion of the surfaces of the exterior core 32.

As shown in FIG. 10 and FIG. 11, the exterior insulator 42 comprises: a covering part 42C, which covers the end surface 32C; a covering part 42D, which covers the end surface 32D; and covering parts 42E, which cover the inner surfaces 32E.

The covering part 42C is disposed more on the one side in the axial direction than the covering part 42D. The covering part 42C and the covering part 42D oppose one another, with a gap interposed therebetween. The covering part 42C and the covering part 42D are connected via the covering parts 42E. The covering part 42C, the covering part 42D, and the covering parts 42E are integral.

The exterior insulator 42 is not disposed on the inner surfaces 32A, the outer surface 32B, the side surfaces 32F, and the side surfaces 32G of the exterior core 32. The inner surfaces 32A, the outer surface 32B, the side surfaces 32F, and the side surfaces 32G include the surfaces of the steel sheets (a metal whose main component is iron).

The interior member 21 is disposed inward of the exterior member 22. The exterior member 22 is disposed around the interior member 21. By inserting the protruding parts 38 of the exterior member 22 into the gaps 43 of the interior member 21, the interior member 21 and the exterior member 22 are coupled to one another. The side surfaces 33I of the interior member 21 and the side surfaces 32G of the exterior member 22 contact one another. The side surfaces 33J of the interior member 21 and the side surfaces 32F of the exterior member 22 contact one another.

[Coil Unit]

Figure 12:
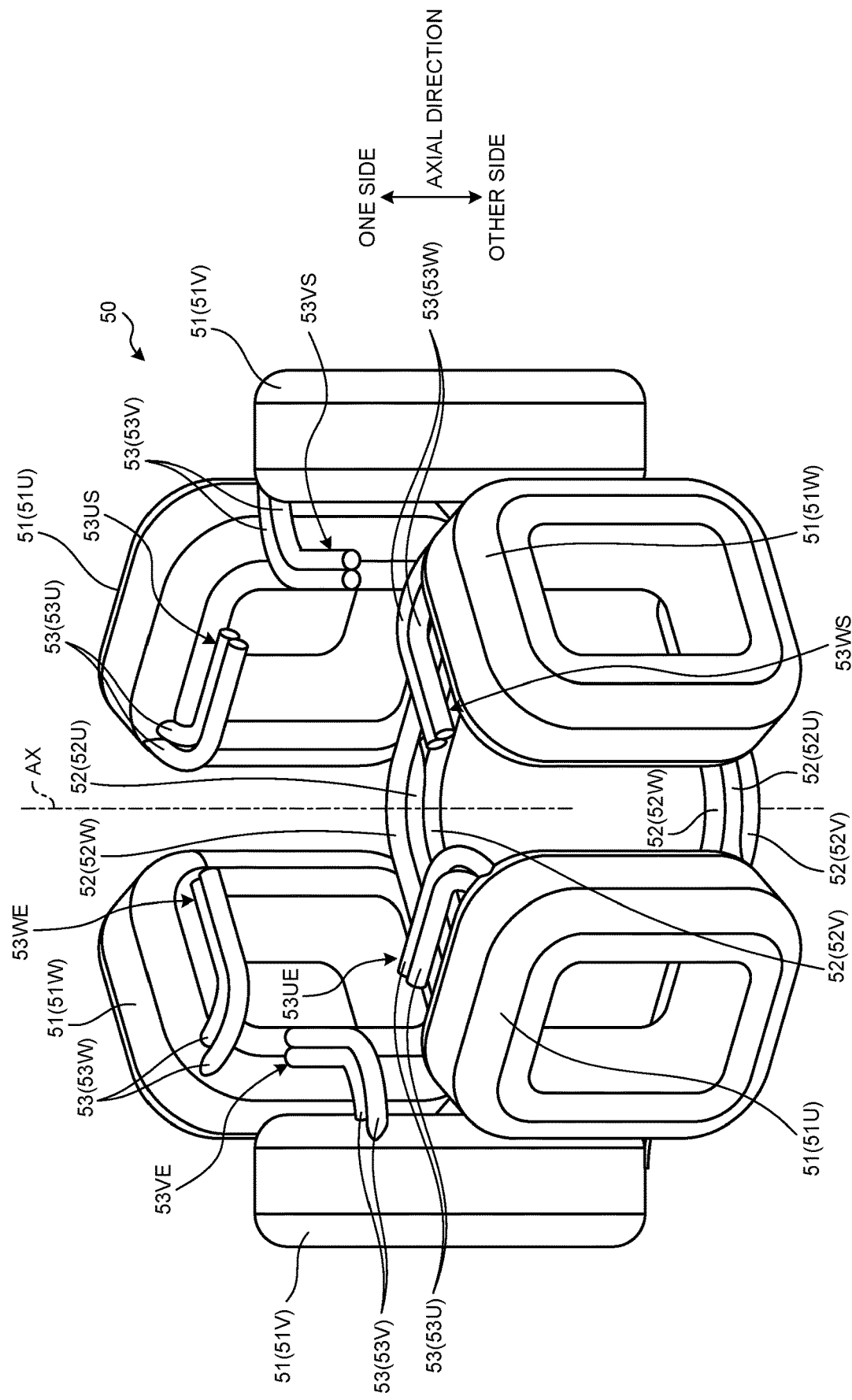
FIG. 12 is an oblique view that shows, from above, a coil unit according to the embodiment.
Figure 13:
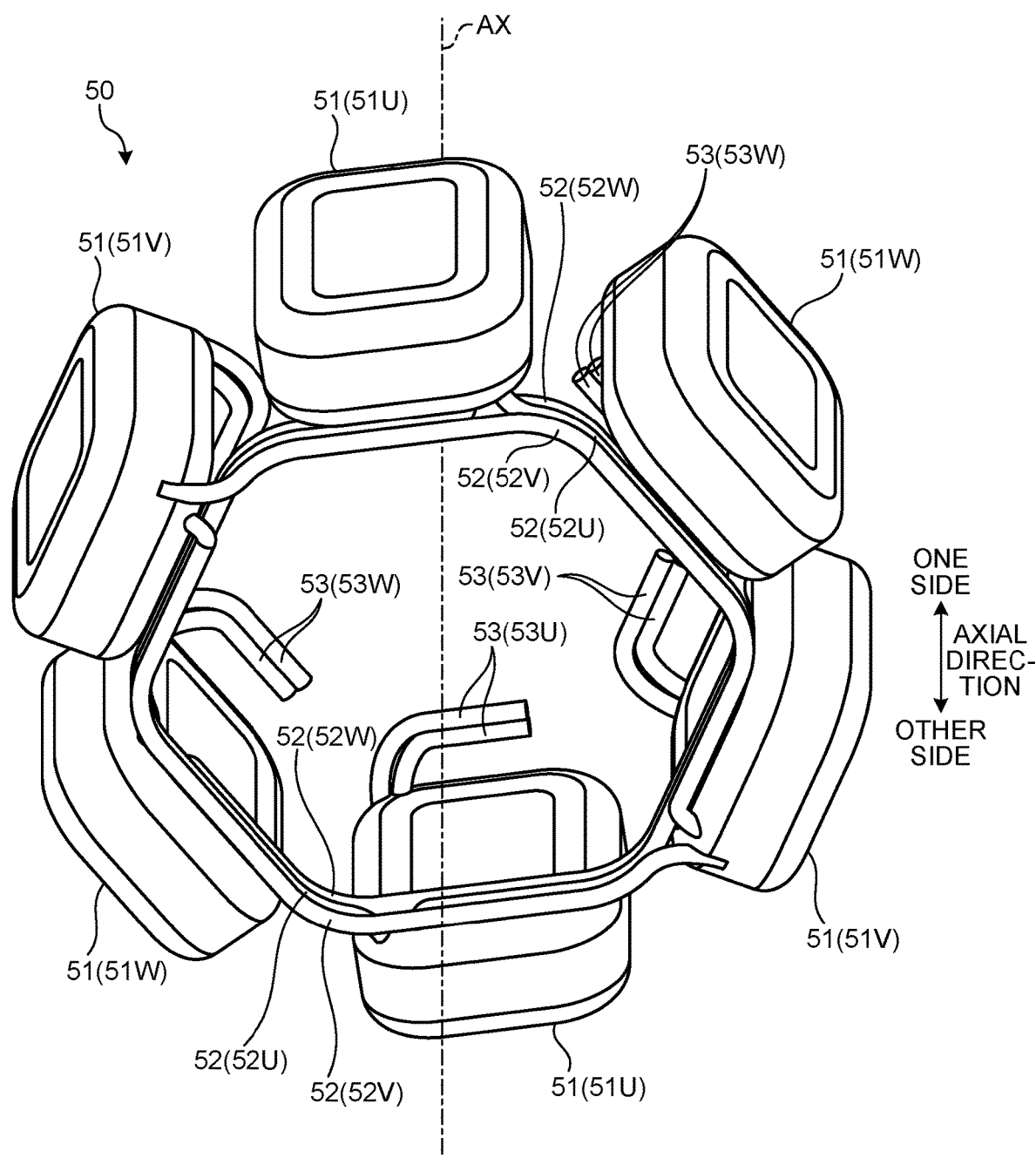
FIG. 13 is an oblique view that shows, from below, the coil unit according to the embodiment.

FIG. 12 is an oblique view that shows the coil unit 50, from above, according to the embodiment. FIG. 13 is an oblique view of the coil unit 50, from below, according to the embodiment.

The coil unit 50 comprises six of the coils 51 and the crossover wires 52, each of which connects one of the coils 51 and another one of the coils 51.

Six of the coils 51 are connected as a U (W-U) phase, a V (U-V) phase, and a W (V-W) phase. A pair of the coils 51 is allocated to each of the phases: the U phase, the V phase, and the W phase.

The six coils 51 include: a pair of U-phase coils 51U, which are allocated to the U phase; a pair of V-phase coils 51y, which are allocated to the V phase; and a pair of W-phase coils 51W, which are allocated to the W phase.

The pair of the U-phase coils 51U is disposed such that the U-phase coils 51U oppose one another in the radial direction. The pair of the V-phase coils 51V is disposed such that the V-phase coils 51V oppose one another in the radial direction. The pair of the W-phase coils 51W is disposed such that the W-phase coils 51W oppose one another in the radial direction.

The crossover wires 52 include: a crossover wire 52U, which connects the pair of U-phase coils 51U; a crossover wire 52V, which connects the pair of V-phase coils 51V; and a crossover wire 52W, which connects the pair of W-phase coils 51W.

The coils 51 are formed by a wire-winding machine. The wire-winding machine forms the coils 51 by winding the wire 53. The wire 53 includes: a wire 53U, which forms the U-phase coils 51U and the crossover wire 52U; a wire 53V, which forms the V-phase coils 51V and the crossover wire 52V; and a wire 53W, which forms the W-phase coils 51W and the crossover wire 52W.

The U-phase coils 51U and the crossover wire 52U are formed of the single wire 53U. As shown in FIG. 12, to form one of the U-phase coils 51U, the wire-winding machine starts winding the wire 53U starting from a winding-start portion 53US. By winding the wire 53U, one of the U-phase coils 51U is formed. To form the other U-phase coil 51U after the one U-phase coil 51U has been formed, the wire-winding machine starts winding the wire 53U at a location opposing the one U-phase coil 51U. By winding the wire 53U, the other U-phase coil 51U is formed. As shown in FIG. 12, the wire-winding machine ends the winding of the wire 53U at a winding-end portion 53UE. The crossover wire 52U is constituted by the wire 53U that connects the one U-phase coil 51U and the other U-phase coil 51U.

The V-phase coils 51V and the crossover wire 52V are formed of a single wire 53V. As shown in FIG. 12, the wire-winding machine starts winding the wire 53V from a winding-start portion 53VS and, after one of the V-phase coils 51V has been formed, forms the other V-phase coil 51V by winding the wire 53V at a location opposing the one V-phase coil 51V. The wire-winding machine ends the winding of the wire 53V at a winding-end portion 53VE. The crossover wire 52V is constituted by the wire 53V that connects the one V-phase coil 51V and the other V-phase coil 51V.

The W-phase coils 51W and the crossover wire 52W are formed of a single wire 53W. As shown in FIG. 12, the wire-winding machine starts winding the wire 53W from a winding-start portion 53WS and, after one of the W-phase coils 51W has been formed, forms the other W-phase coil 51W by winding the wire 53W at a location opposing the one W-phase coil 51W. The wire-winding machine ends the winding of the wire 53W at a winding-end portion 53WE. The crossover wire 52W is constituted by the wire 53W that connects the one W-phase coil 51W and the other W-phase coil 51W.

It is noted that, in the embodiment, the wire-winding machine forms the coils 51 and the crossover wires 52 while simultaneously feeding out two of the wires 53. The wire-winding machine may form the coils 51 and the crossover wires 52 by paying out one of the wires 53.

[Terminal Unit]

Figure 14:
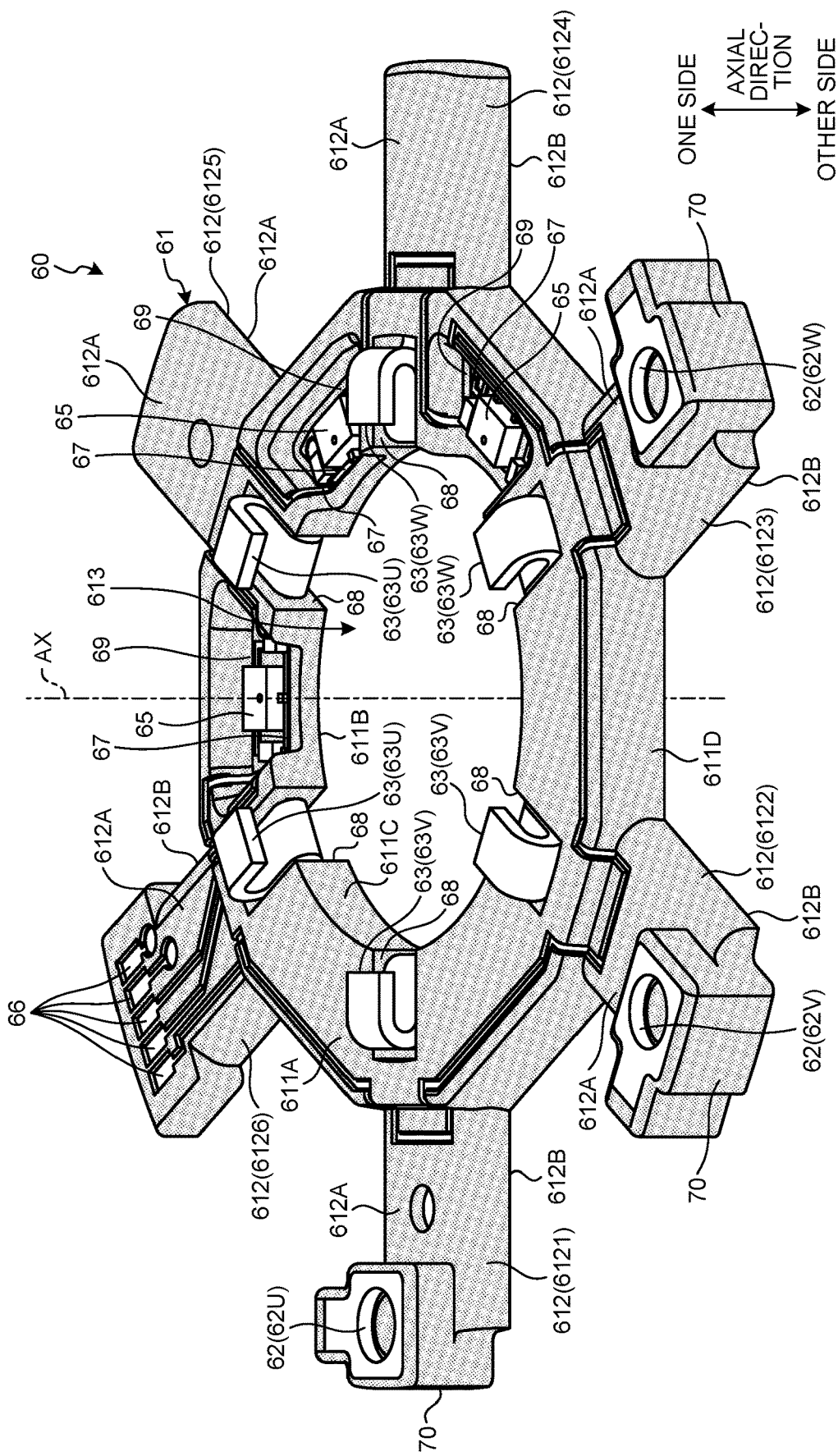
FIG. 14 is an oblique view that shows a terminal unit according to the embodiment.
Figure 15:
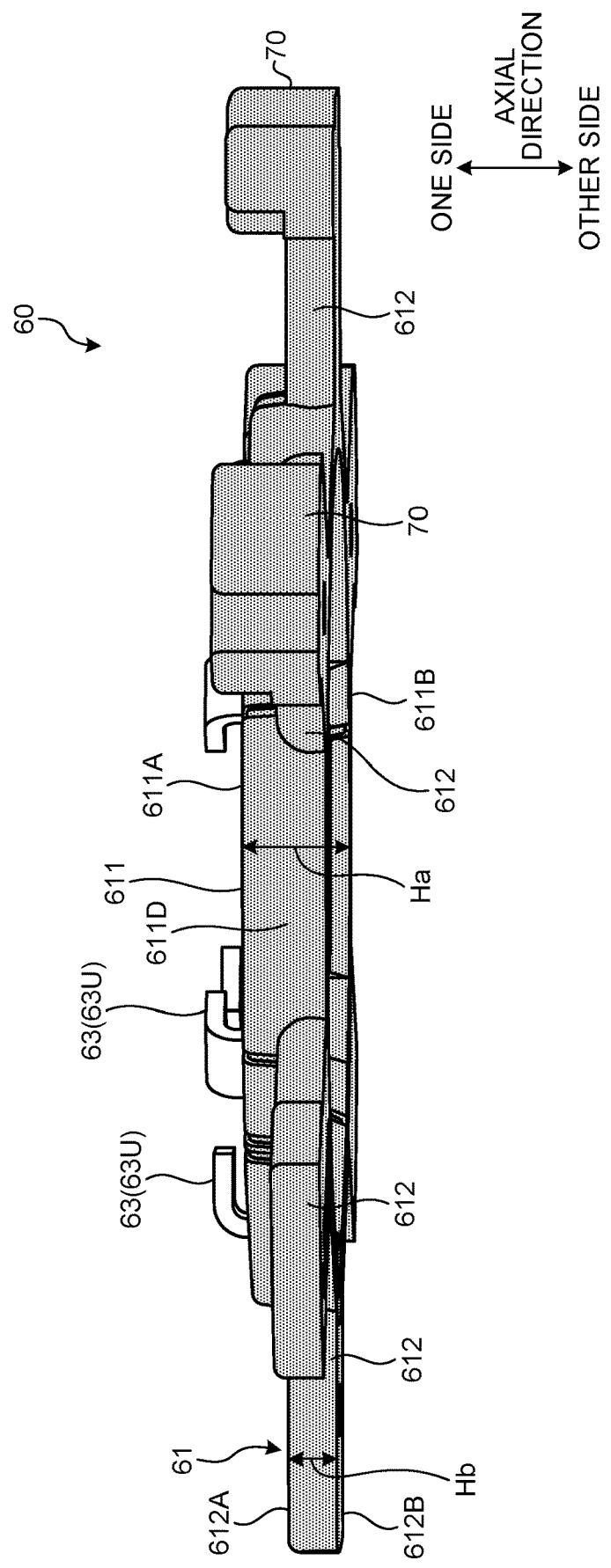
FIG. 15 is a side view that shows the terminal unit according to the embodiment.
Figure 16:
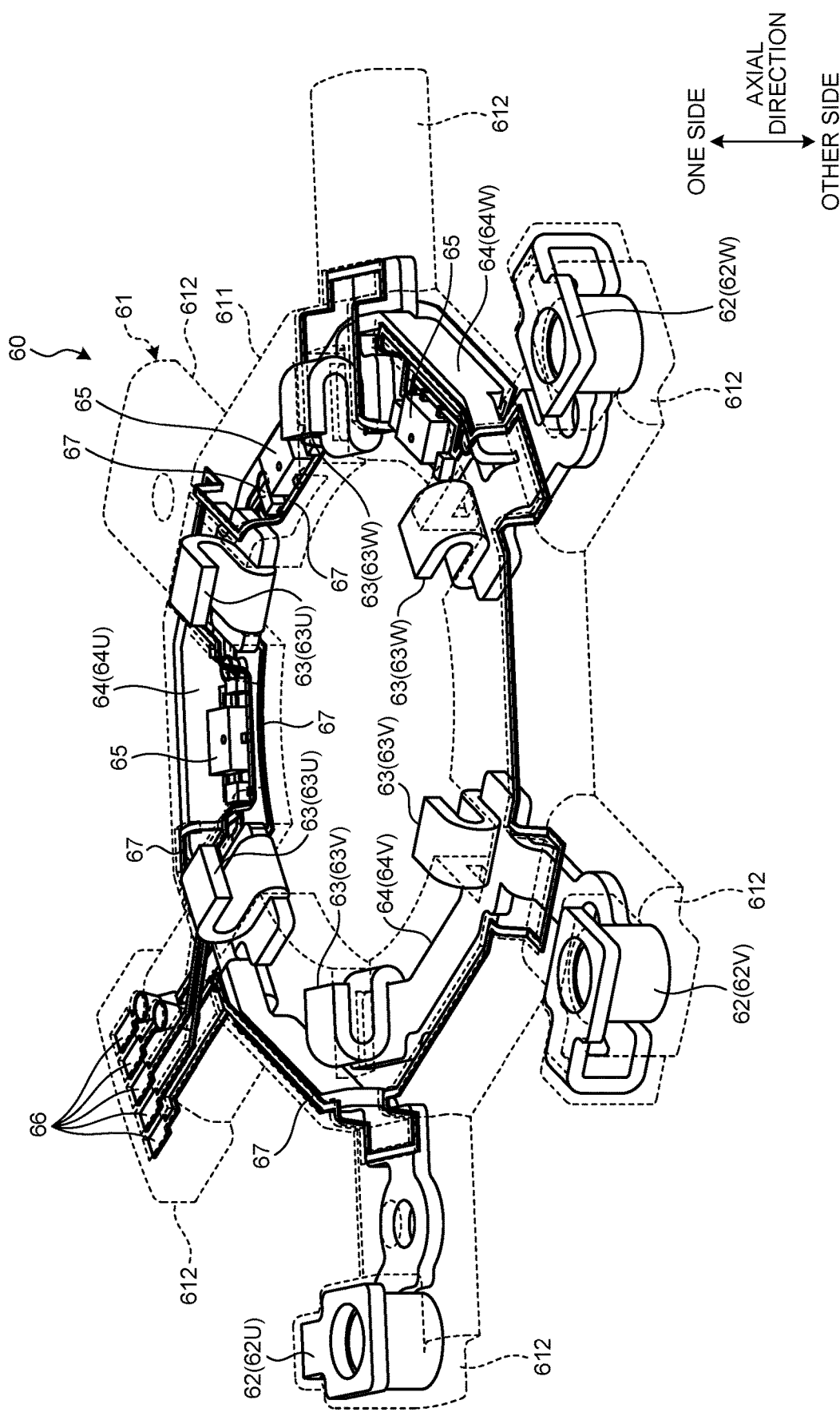
FIG. 16 is an oblique view that shows the internal structure of the terminal unit according to the embodiment.
Figure 17:
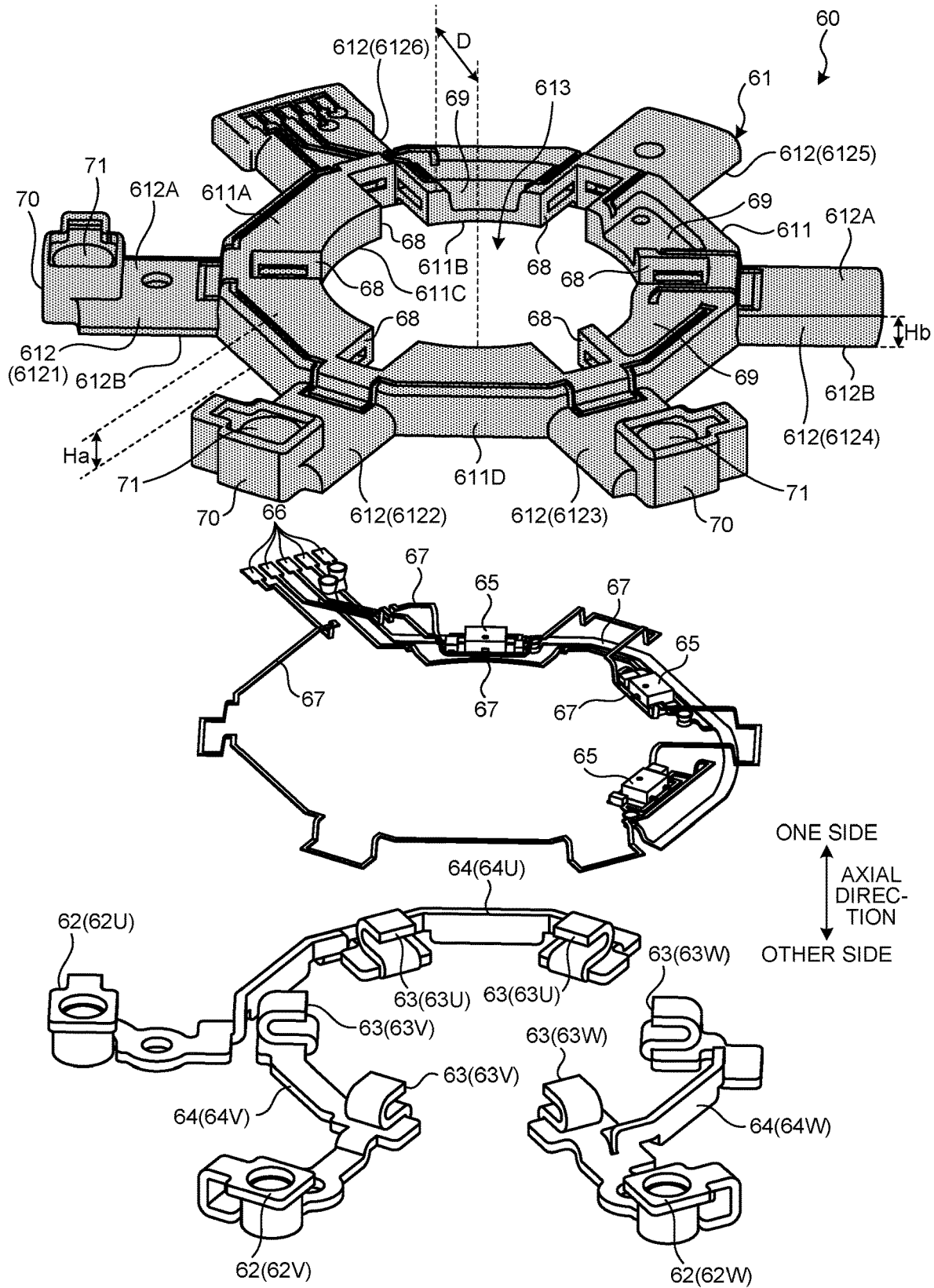
FIG. 17 is an exploded, oblique view that shows the terminal unit according to the embodiment.

FIG. 14 is an oblique view that shows the terminal unit 60 according to the embodiment. FIG. 15 is a side view that shows the terminal unit 60 according to the embodiment. FIG. 16 is an oblique view that shows the internal structure of the terminal unit 60 according to the embodiment. FIG. 17 is an exploded, oblique view that shows the terminal unit 60 according to the embodiment.

The terminal unit 60 comprises: the support member 61; the exterior terminals 62, into which the drive currents are input; the fusing terminals 63, which are connected to the coils 51; the short-circuiting members 64, which connect the exterior terminals 62 and the fusing terminals 63; the plurality of rotation-detection devices 65, which detects the rotation of the rotor 19; the signal terminals 66, from which the detection signals of the rotation-detection devices 65 are output; and the signal lines 67, which connect the rotation-detection devices 65 and the signal terminals 66.

The support member 61 is made of an insulating material. The support member 61 is made of a synthetic resin. The support member 61 supports the fusing terminals 63, the short-circuiting members 64, the rotation-detection devices 65, the signal terminals 66, and the signal lines 67. At least a portion of the support member 61 is disposed more inward in the radial direction than the coils 51. At least a portion of the support member 61 is disposed more outward in the radial direction than the coils 51.

The support member 61 comprises a ring-shaped part 611 and protruding parts 612, which protrude outward in the radial direction from the ring-shaped part 611. The ring-shaped part 611 has an opening 613. The opening 613 is substantially circular within a plane orthogonal to the rotational axis AX.

The ring-shaped part 611 has a plate shape. The ring-shaped part 611 has: an end surface 611A, which faces the one side in the axial direction; an end surface 611B, which faces the other side in the axial direction; an inner surface 611C, which faces inward in the radial direction; and an outer surface 611D, which faces outward in the radial direction. The inner surface 611C defines the opening 613. The inner surface 611C opposes the rotor 19.

As shown in FIG. 15 and FIG. 17, a thickness Ha of the ring-shaped part 611 is smaller than the diameter D of the opening 613. The thickness Ha refers to the distance between the end surface 611A and the end surface 611B in the axial direction.

The ring-shaped part 611 has recessed parts 68, which are recessed outward in the radial direction from the inner surface 611C. Six of the recessed parts 68 are provided spaced apart in the circumferential direction. The fusing terminals 63 are disposed inward of the recessed parts 68, respectively.

The ring-shaped part 611 has recessed parts 69, which are provided in the end surface 611A. Three of the recessed parts 69 are provided spaced apart in the circumferential direction. The rotation-detection devices 65 are disposed in the recessed parts 69, respectively.

The protruding parts 612 protrude outward in the radial direction from the outer surface 611D of the ring-shaped part 611. Six of the protruding parts 612 are provided spaced apart in the circumferential direction. The protruding parts 612 comprise a first protruding part 6121, a second protruding part 6122, a third protruding part 6123, a fourth protruding part 6124, a fifth protruding part 6125, and a sixth protruding part 6126.

The protruding parts 612 have a sheet shape. The protruding parts 612 have an end surface 612A, which faces the one side in the axial direction, and an end surface 612B, which faces the other side in the axial direction.

As shown in FIG. 15 and FIG. 17, a thickness Hb of each of the protruding parts 612 is smaller than the thickness Ha of the ring-shaped part 611. The thickness Hb refers to the distance between the end surface 612A and the end surface 612B in the axial direction.

The first protruding part 6121, the second protruding part 6122, and the third protruding part 6123 each have a support part 70, which supports an exterior terminal 62. The second protruding part 6122 is disposed adjacent to the first protruding part 6121 in the circumferential direction, and the third protruding part 6123 is disposed adjacent to the second protruding part 6122 in the circumferential direction. The support parts 70 have a block shape. As shown in FIG. 17, the support parts 70 have a hole 71, in which at least a portion of an exterior terminal 62 is disposed. The signal terminals 66 are disposed on the sixth protruding part 6126.

The exterior terminals 62 are connected to the power-supply unit. The exterior terminals 62 are disposed more outward in the radial direction than the coils 51. The exterior terminals 62 are connected to the short-circuiting members 64.

The drive currents from the power-supply unit are input to the exterior terminals 62. The exterior terminals 62 comprise: the U-phase, outer-part terminal 62U, into which the U-phase drive current is input; the V-phase, outer-part terminal 62V, into which the V-phase drive current is input; and the W-phase, outer-part terminal 62W, into which the W-phase drive current is input.

The exterior terminals 62 are supported by the support member 61. The exterior terminals 62 are disposed on the protruding parts 612. The U-phase, outer-part terminal 62U is disposed on the first protruding part 6121. The V-phase, outer-part terminal 62V is disposed on the second protruding part 6122. The W-phase, outer-part terminal 62W is disposed on the third protruding part 6123.

The fusing terminals 63 are connected to the coils 51. The fusing terminals 63 are disposed more inward in the radial direction than the coils 51. In the embodiment, the fusing terminals 63 are connected to the wires 53, which protrude inward in the radial direction from the coils 51. The fusing terminals 63 are connected to the coils 51 via the wires 53, which protrude inward in the radial direction from the coils 51.

The fusing terminals 63 are supported by the support member 61. The fusing terminals 63 are disposed on the ring-shaped part 611. A plurality of the fusing terminals 63 is disposed around the rotational axis AX. The locations of the fusing terminals 63 in the axial direction are substantially the same.

The number of fusing terminals 63 that are provided is the same as the number of coils 51, and only that number is provided. In the embodiment, six of the fusing terminals 63 are provided. The fusing terminals 63 comprise a pair of fusing terminals 63U, a pair of fusing terminals 63V, and a pair of fusing terminals 63W.

The short-circuiting members 64 are supported by the support member 61. The short-circuiting members 64 connect the exterior terminals 62 and the fusing terminals 63. At least a portion of each of the short-circuiting members 64 is disposed more inward in the radial direction than the coils 51. At least a portion of each of the short-circuiting members 64 is disposed more outward in the radial direction than the coils 51. The fusing terminals 63 and the short-circuiting members 64 are integral. That is, the fusing terminals 63 and the short-circuiting members 64 are a single member.

The short-circuiting members 64 are curved within a plane orthogonal to the rotational axis AX. The drive currents input to the exterior terminals 62 are supplied to the coils 51 via the short-circuiting members 64 and the fusing terminals 63.

The short-circuiting members 64 comprise: a short-circuiting member 64U, which connects the U-phase, outer-part terminal 62U with the pair of fusing terminals 63U; a short-circuiting member 64V, which connects the V-phase, outer-part terminal 62V with the pair of fusing terminals 63V; and a short-circuiting member 64W, which connects the W-phase, outer-part terminal 62W with the pair of fusing terminals 63W. The fusing terminals 63U and the short-circuiting member 64U are a single member. The fusing terminals 63V and the short-circuiting member 64V are a single member. The fusing terminals 63W and the short-circuiting member 64W are a single member.

The U-phase, outer-part terminal 62U is disposed at one-end portion of the short-circuiting member 64U. One of the fusing terminals 63U is disposed at the other-end portion of the short-circuiting member 64U. The other fusing terminal 63U is disposed at an intermediate portion of the short-circuiting member 64U. The intermediate portion of the short-circuiting member 64U refers to a part between the one-end portion and the other-end portion of the short-circuiting member 64U.

The V-phase, outer-part terminal 62V is disposed at one-end portion of the short-circuiting member 64V. One of the fusing terminals 63V is disposed at the other-end portion of the short-circuiting member 64V. The other fusing terminal 63V is disposed at an intermediate portion of the short-circuiting member 64V. The intermediate portion of the short-circuiting member 64V refers to a part between the one-end portion and the other-end portion of the short-circuiting member 64V.

The W-phase, outer-part terminal 62W is disposed at one-end portion of the short-circuiting member 64W. One of the fusing terminals 63W is disposed at the other-end portion of the short-circuiting member 64W. The other fusing terminal 63W is disposed at an intermediate portion of the short-circuiting member 64W. The intermediate portion of the short-circuiting member 64W refers to a part between the one-end portion and the other-end portion of the short-circuiting member 64W.

The rotation-detection devices 65 are supported by the support member 61. The rotation-detection devices 65 are disposed on the ring-shaped part 611. The rotation-detection devices 65 detect the location of the rotor 19 in the rotational direction by detecting the locations of permanent magnets provided on the rotor 19. The rotation-detection devices 65 comprise Hall-effect devices. Three of the rotation-detection devices 65 are provided. The rotation-detection devices 65 are disposed inward in the radial direction of the coils 51. The detection signals of the rotation-detection devices 65 are output to the controller 18 via the signal lines 67 and the signal terminals 66. The controller 18 supplies drive currents to the coils 51 based on the detection signals of the rotation-detection devices 65.

The signal terminals 66 are supported by the support member 61. The signal terminals 66 are disposed more outward in the radial direction than the coils 51. The signal terminals 66 are connected to the rotation-detection devices 65 via the signal lines 67. At least a portion of each of the signal lines 67 is disposed more inward in the radial direction than the coils 51. At least a portion of each of the signal lines 67 is disposed more outward in the radial direction than the coils 51.

At least a portion of each of the short-circuiting members 64 is disposed in the interior of the support member 61. At least a portion of each of the signal lines 67 is disposed in the interior of the support member 61. The short-circuiting members 64 and the signal lines 67 are molded using a synthetic resin. The terminal unit 60 comprises a molded interconnect device (MID: molded interconnect device). By molding the short-circuiting members 64 and the signal lines 67 using a synthetic resin, at least a portion of each of the short-circuiting members 64 and at least a portion of each of the signal lines 67 is disposed in the interior of the support member 61.

Figure 18:
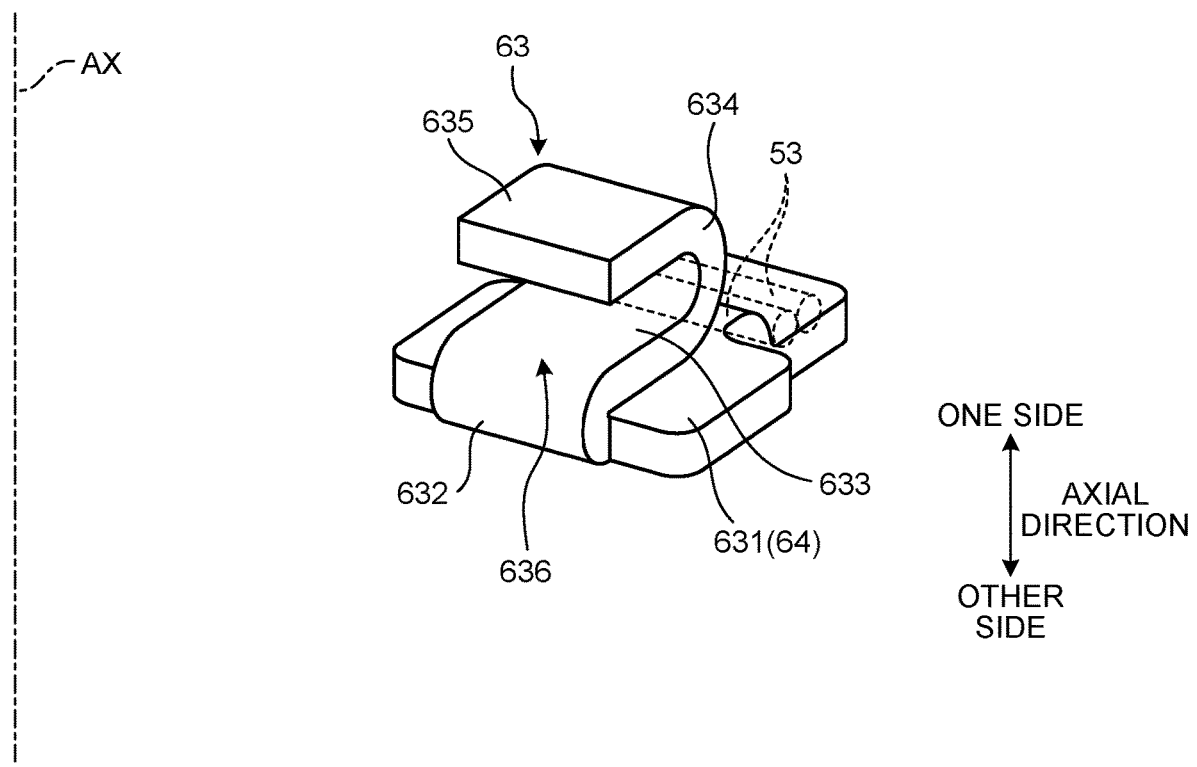
FIG. 18 is an oblique view that shows a fusing terminal according to the embodiment.

FIG. 18 is an oblique view that shows a fusing terminal 63 according to the embodiment. As shown in FIG. 18, the fusing terminal 63 comprises a base part 631, a connecting part 632, a first plate part 633, a curved part 634, and a second plate part 635.

The base part 631 is connected to the short-circuiting member 64. It is noted that the base part 631 may be considered to be at least a portion of the short-circuiting member 64.

The first plate part 633 is disposed on the one side in the axial direction of the base part 631. The second plate part 635 is disposed on the one side in the axial direction of the first plate part 633.

The connecting part 632 connects the end portion of the base part 631 that is inward in the radial direction and the end portion of the first plate part 633 that is inward in the radial direction.

The curved part 634 connects the end portion of the first plate part 633 that is outward in the radial direction and the end portion of the second plate part 635 that is outward in the radial direction.

In the fusing terminal 63, an opening 636 is defined between the end portion of the first plate part 633 that is inward in the radial direction and the end portion of the second plate part 635 that is inward in the radial direction. Wires 53 are capable of passing through the opening 636. The wires 53 are connected to the fusing terminal 63 in the state in which they are disposed between the first plate part 633 and the second plate part 635.

[Relationship Between Coils and Fusing Terminals]

Figure 19:
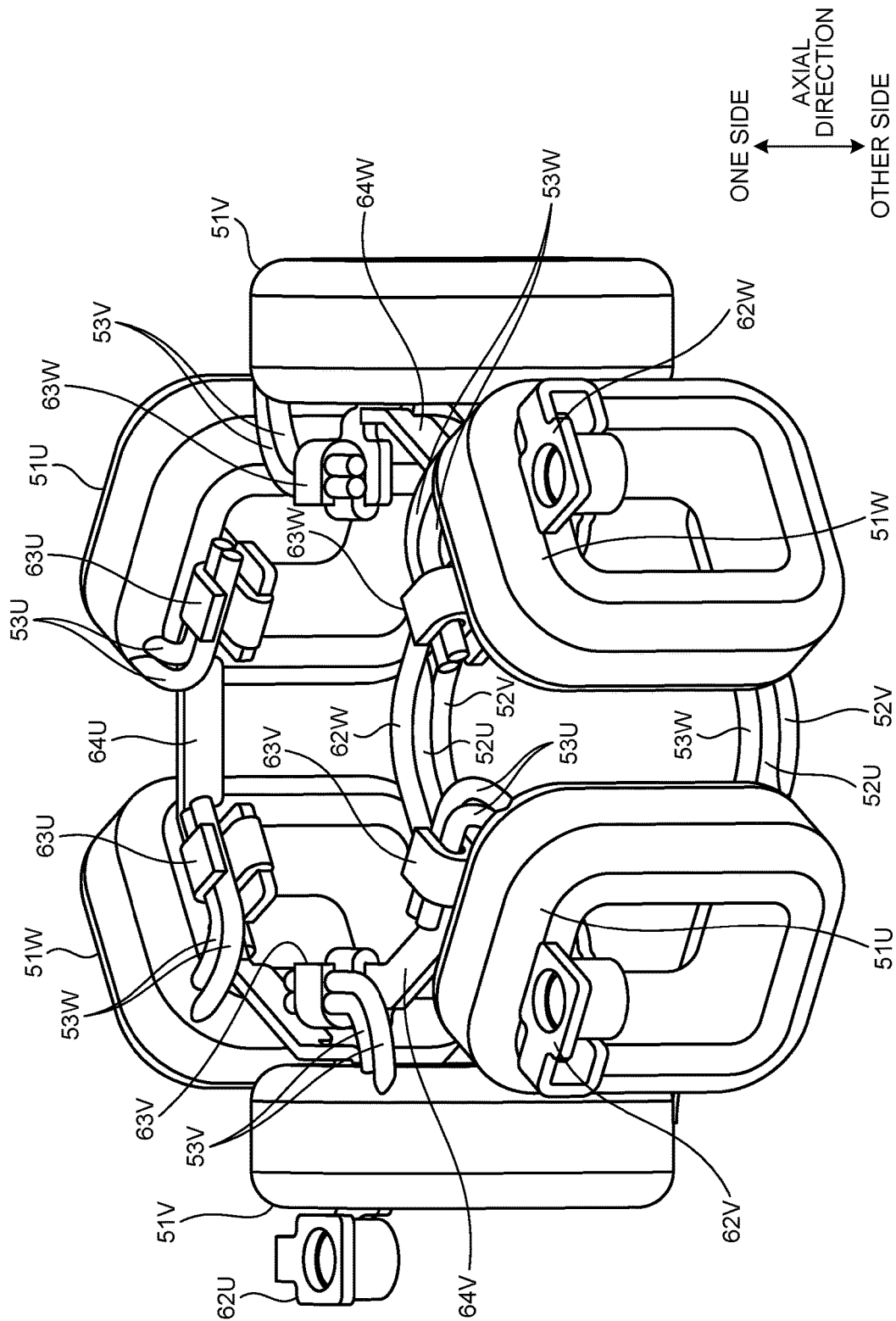
FIG. 19 is an oblique view that shows the relationship between the coils and the fusing terminals according to the embodiment.

FIG. 19 is an oblique view that shows the relationship between the coils 51 and the fusing terminals 63 according to the embodiment. The fusing terminals 63 comprise the fusing terminals 63U, the fusing terminals 63V, and the fusing terminals 63W. Two of the fusing terminals 63U are provided. Two of the fusing terminals 63V are provided. Two of the fusing terminals 63W are provided.

The fusing terminals 63U are connected to the W-phase coil 51W and the U-phase coil 51U that are adjacent to one another in the circumferential direction. The fusing terminals 63V are connected to the U-phase coil 51U and the V-phase coil 51V that are adjacent to one another in the circumferential direction. The fusing terminals 63W are connected to the V-phase coil 51V and the W-phase coil 51W that are adjacent to one another in the circumferential direction.

The short-circuiting member 64U connects the two fusing terminals 63U. The short-circuiting member 64V connects the two fusing terminals 63V. The short-circuiting member 64W connects the two fusing terminals 63W.

Two of the U-phase coils 51U are provided. A fusing terminal 63U is connected to one of the U-phase coils 51U. A fusing terminal 63V is connected to the other U-phase coil 51U.

Two of the V-phase coils 51V are provided. A fusing terminal 63V is connected to one of the V-phase coils 51V. A fusing terminal 63W is connected to the other V-phase coil 51V.

Two of the W-phase coils 51W are provided. A fusing terminal 63W is connected to one of the W-phase coils 51W. A fusing terminal 63U is connected to the other W-phase coil 51W.

One of the fusing terminals 63U is connected to the wire 53W that protrudes inward in the radial direction from a W-phase coil 51W. The other fusing terminal 63U is connected to the wire 53U that protrudes inward in the radial direction from a U-phase coil 51U.

One of the fusing terminals 63V is connected to the wire 53U that protrudes inward in the radial direction from a U-phase coil 51U. The other fusing terminal 63V is connected to the wire 53V that protrudes inward in the radial direction from a V-phase coil 51V.

One of the fusing terminals 63W is connected to the wire 53V that protrudes inward in the radial direction from a V-phase coil 51V. The other fusing terminal 63W is connected to the wire 53W that protrudes inward in the radial direction from a W-phase coil 51W.

The two U-phase coils 51U are connected via the crossover wire 52U.

The two V-phase coils 51V are connected via the crossover wire 52V.

The two W-phase coils 51W are connected via the crossover wire 52W.

Figure 20:
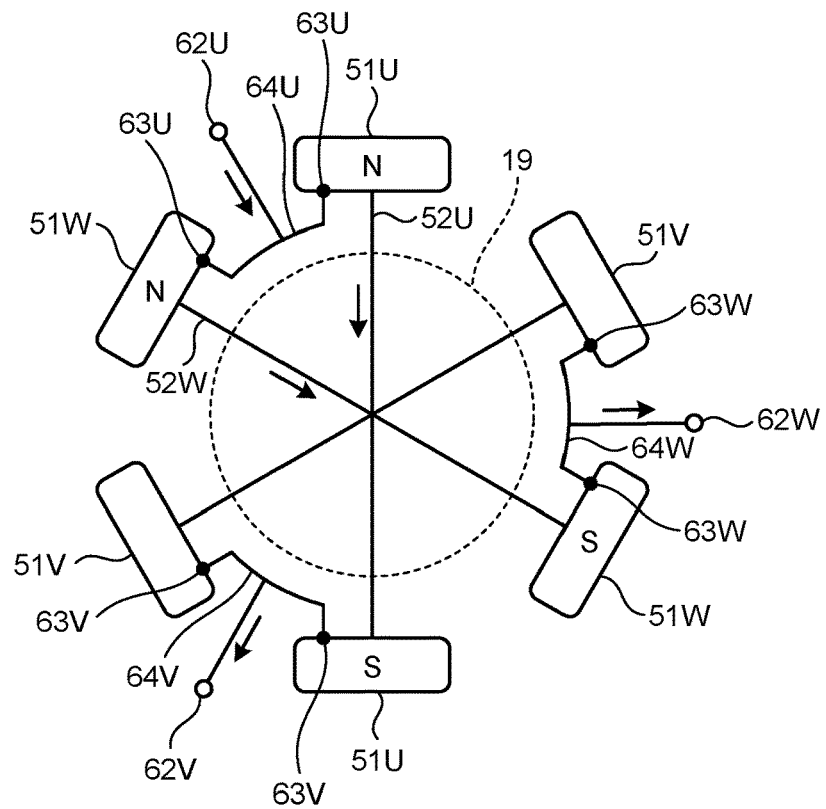
FIG. 20 is a drawing that schematically shows one example of a flow state of drive currents according to the embodiment.
Figure 21:
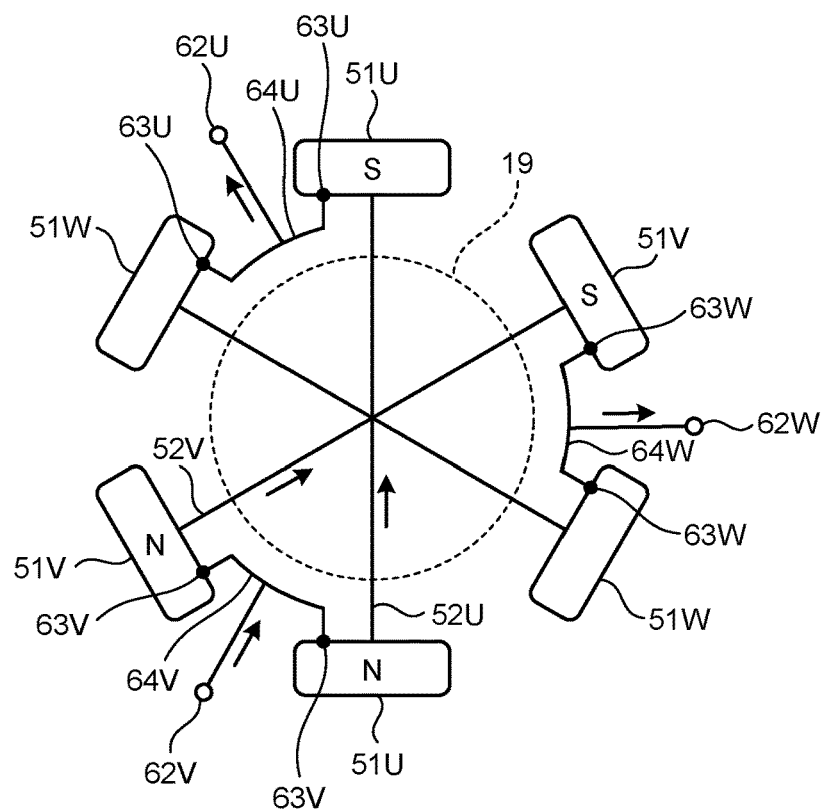
FIG. 21 is a drawing that schematically shows one example of a flow state of the drive currents according to the embodiment.
Figure 22:
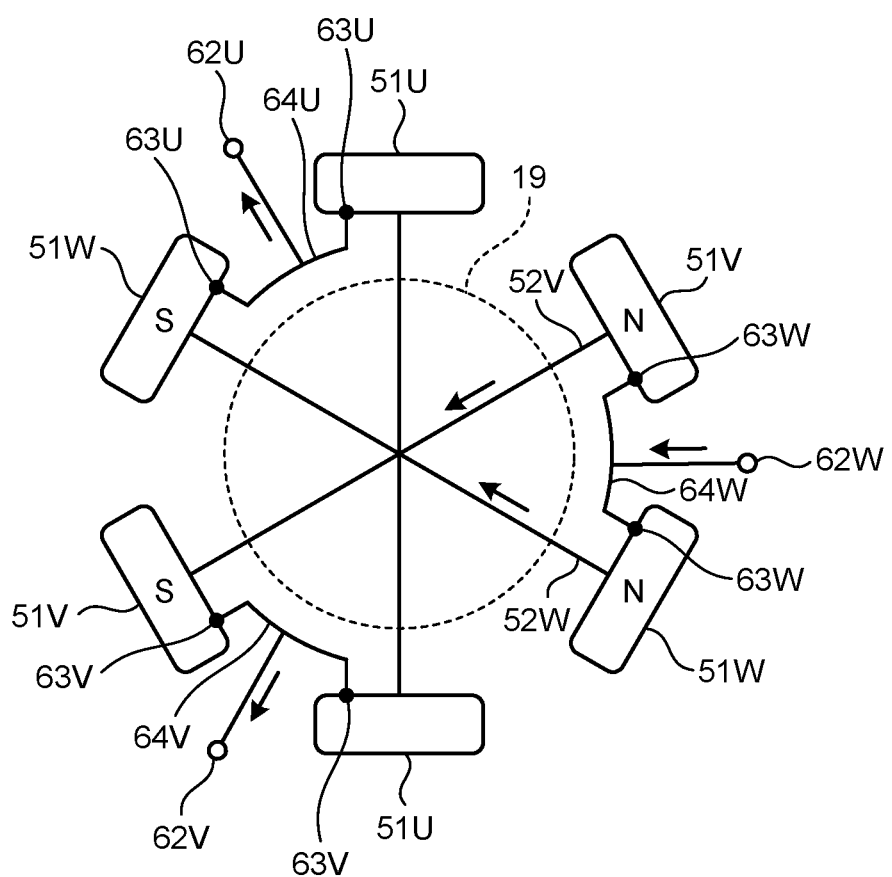
FIG. 22 is a drawing that schematically shows one example of a flow state of the drive currents according to the embodiment.

Each of FIG. 20, FIG. 21, and FIG. 22 is a drawing that schematically shows one example of a flow state of drive currents according to the embodiment.

As shown in FIG. 20, when the U-phase drive current is input to the U-phase, outer-part terminal 62U, the U-phase drive current is supplied to one of the W-phase coils 51W and one of the U-phase coils 51U via the short-circuiting member 64U and the fusing terminals 63U. The one W-phase coil 51W and the one U-phase coil 51U are each excited to, for example, the N pole. The U-phase drive current that has flowed through the one W-phase coil 51W is supplied to the other W-phase coil 51W via the crossover wire 52W. The U-phase drive current that has flowed through the one U-phase coil 51U is supplied to the other U-phase coil 51U via the crossover wire 52U. The other W-phase coil 51W and the other U-phase coil 51U are each excited to, for example, the S pole. The W-phase drive current that has flowed through the other W-phase coil 51W is output from the W-phase, outer-part terminal 62W. The U-phase drive current that has flowed through the other U-phase coil 51U is output from the V-phase, outer-part terminal 62V.

As shown in FIG. 21, when the V-phase drive current is input to the V-phase, outer-part terminal 62V, the V-phase drive current is supplied to one of the U-phase coils 51U and one of the V-phase coils 51V via the short-circuiting member 64V and the fusing terminals 63V. The one U-phase coil 51U and the one V-phase coil 51V are each excited to, for example, the N pole. The V-phase drive current that has flowed through the one U-phase coil 51U is supplied to the other U-phase coil 51U via the crossover wire 52U. The V-phase drive current that has flowed through the one V-phase coil 51V is supplied to the other V-phase coil 51V via the crossover wire 52V. The other U-phase coil 51U and the other V-phase coil 51V are each excited to, for example, the S pole. The V-phase drive current that has flowed through the other U-phase coil 51U is output from the U-phase, outer-part terminal 62U. The V-phase drive current that circulated through the other V-phase coil 51V is output from the W-phase, outer-part terminal 62W.

As shown in FIG. 22, when the W-phase drive current is input to the W-phase, outer-part terminal 62W, the W-phase drive current is supplied to one of the V-phase coils 51V and one of the W-phase coils 51W via the short-circuiting member 64W and the fusing terminals 63W. The one V-phase coil 51V and the one W-phase coil 51W are each excited to, for example, the N pole. The W-phase drive current that has flowed through the one V-phase coil 51V is supplied to the other V-phase coil 51V via the crossover wire 52V. The W-phase drive current that has flowed through the one W-phase coil 51W is supplied to the other W-phase coil 51W via the crossover wire 52W. The other V-phase coil 51V and the other W-phase coil 51W are each excited to, for example, the S pole. The W-phase drive current that has flowed through the other V-phase coil 51V is output from the V-phase, outer-part terminal 62V. The W-phase drive current that has flowed through the other W-phase coil 51W is output from the U-phase, outer-part terminal 62U.

[Method of Assembling the Stator]

Next, a method of assembling the stator 20 according to the embodiment will be explained. Each of FIG. 23 to FIG. 27 is a drawing for explaining the method of assembling the stator 20 according to the embodiment.

Figure 23:
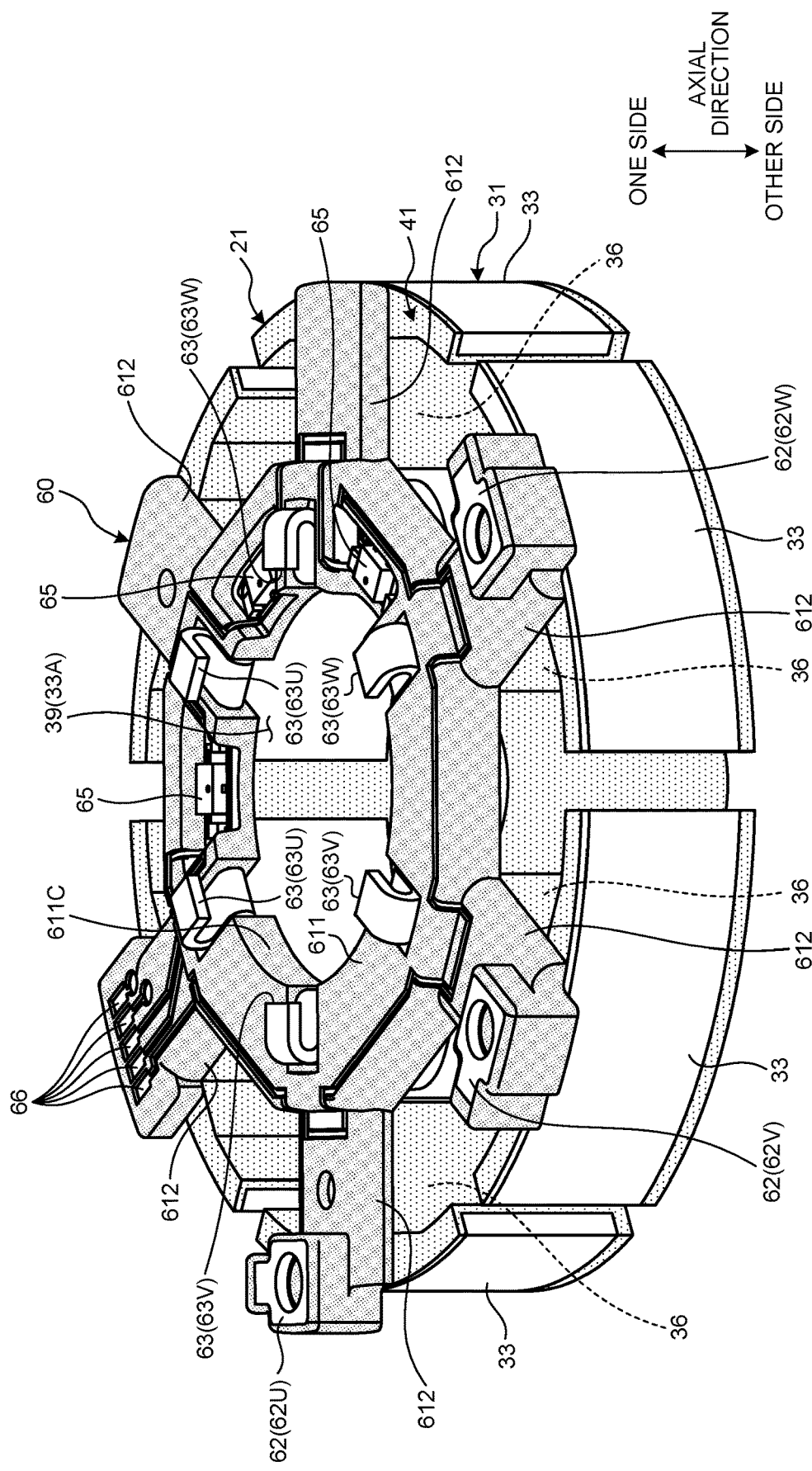
FIG. 23 is a drawing for explaining a method of assembling the stator according to the embodiment.

As shown in FIG. 23, the terminal unit 60 is disposed on the one side in the axial direction of the interior member 21, which comprises the interior core 31 and the interior insulator 41. The support member 61 is disposed on the one side in the axial direction of the interior core 31. The support member 61 is supported by the interior core 31 via the interior insulator 41.

The protruding parts 612 of the support member 61 are disposed such that they are adjacent to the tooth parts 36 in the axial direction. That is, the terminal unit 60 is disposed on the one side in the axial direction of the interior member 21 such that the locations of the protruding parts 612 and the locations of the tooth parts 36 coincide in the circumferential direction.

As shown in FIG. 23, at least a portion of the support member 61 is disposed more inward in the radial direction than the inner surface 39 of the stator core 30. The inner surface 39 of the stator core 30 includes the inner surface of the interior core 31. The inner surface of the interior core 31 includes the inner surfaces 33A of the core segments 33 and the inner surfaces of the coupling parts 41J.

In the embodiment, at least a portion of the ring-shaped part 611 of the support member 61 is disposed more inward in the radial direction than the inner surface 39 of the stator core 30. That is, the distance between the inner surface 611C of the ring-shaped part 611 and the rotational axis AX in the radial direction is shorter than the distance between the inner surface 39 of the stator core 30 and the rotational axis AX.

In addition, at least a portion of each of the fusing terminals 63 is disposed more inward in the radial direction than the inner surface 39 of the stator core 30.

Figure 24:
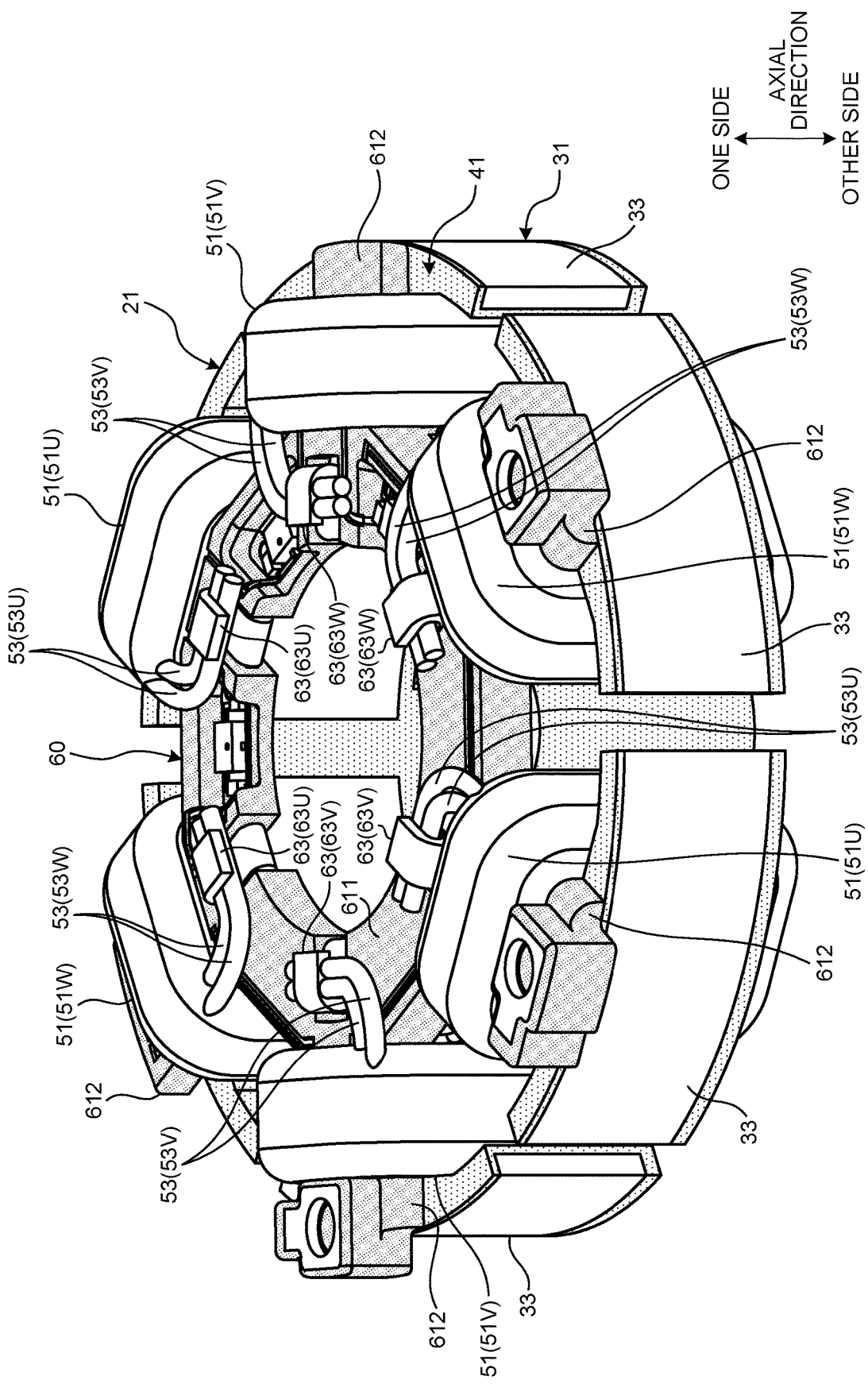
FIG. 24 is a drawing for explaining the method of assembling the stator according to the embodiment.

As shown in FIG. 24, after the terminal unit 60 has been disposed on the one side in the axial direction of the interior member 21, the coils 51 are wound. The coils 51 are disposed so as to wind around at least a portion of the support member 61. The coils 51 are disposed so as to wind around the tooth parts 36 and the protruding parts 612.

The coils 51 are disposed more outward in the radial direction than the ring-shaped part 611 so as to wind around the tooth parts 36 and the protruding parts 612. The ring-shaped part 611 is disposed more inward in the radial direction than the coils 51.

The coils 51 are wound by the wire-winding machine. The coils 51 are wound around the tooth parts 36 and the protruding parts 612 using a stipulated winding method. A nozzle method and a flyer method are illustrative examples of methods of winding the coils 51. The wire-winding machine has a nozzle that is capable of feeding the wires 53. In the situation in which the coils 51 are wound around the tooth parts 36 and the protruding parts 612 using the nozzle method, the nozzle enters between the tooth part 36 and the protruding part 612 that are adjacent to one another through the gap 43 and then goes around the tooth part 36 and the protruding part 612 while feeding out the wire 53. In the state in which the wire 53 has been fed out from the nozzle, the nozzle goes around the tooth part 36 and the protruding part 612, and thereby the coil 51 is provided around the tooth part 36 and the protruding part 612. The interior core 31, which comprises the coils 51 and the tooth parts 36, is electrically insulated by the interior insulator 41.

It is noted that the winding method is not limited to the nozzle method and the flyer method.

Figure 25:
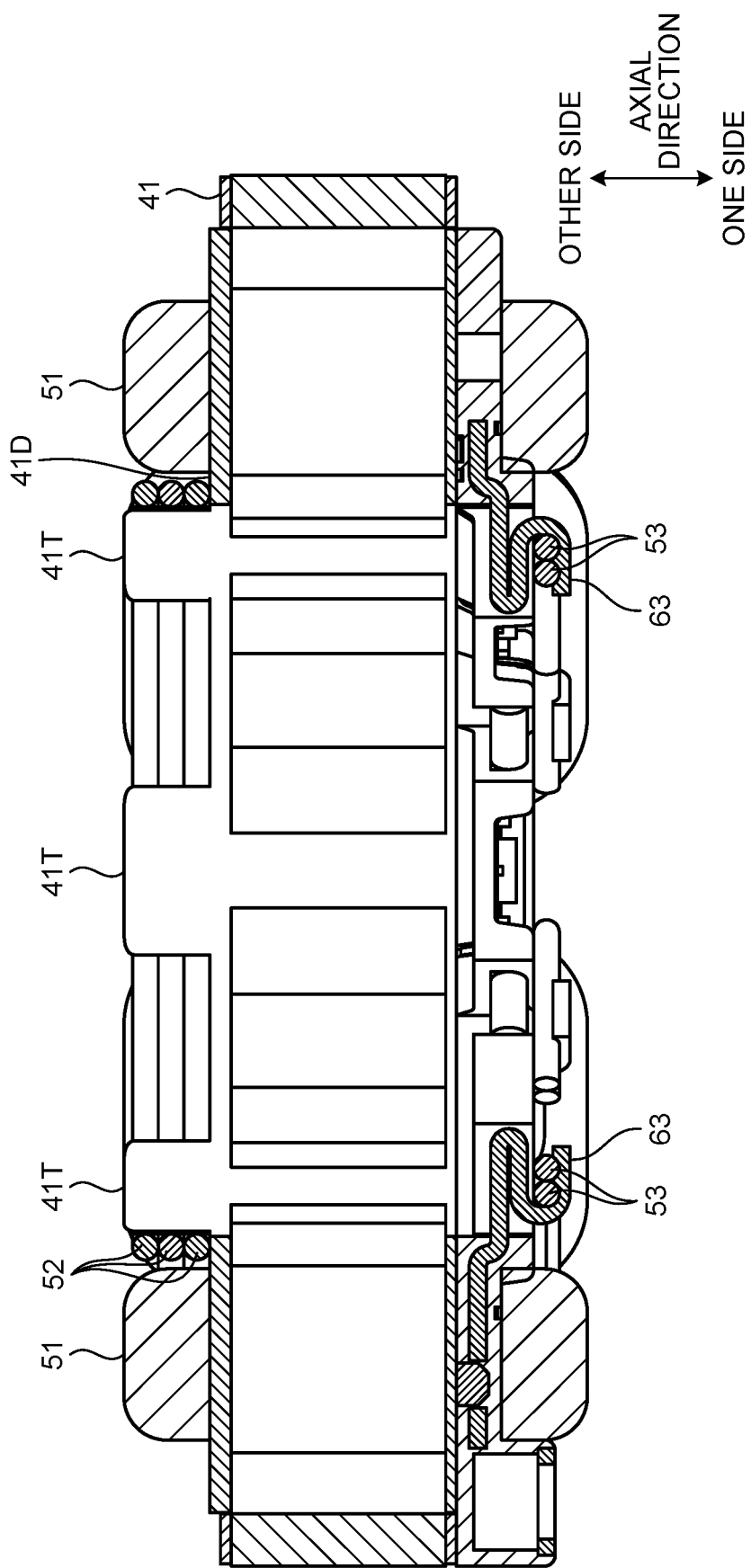
FIG. 25 is a drawing for explaining the method of assembling the stator according to the embodiment.

As shown in FIG. 25, the crossover wires 52, which connect the plurality of coils 51, are disposed around the interior insulator 41 and the protruding parts 41T. The protruding parts 41T protrude on the other side in the axial direction from the covering parts 41D. The crossover wires 52 are disposed so as to wind around the protruding parts 41T. The plurality of crossover wires 52 are stacked in, for example, the axial direction.

Figure 26:
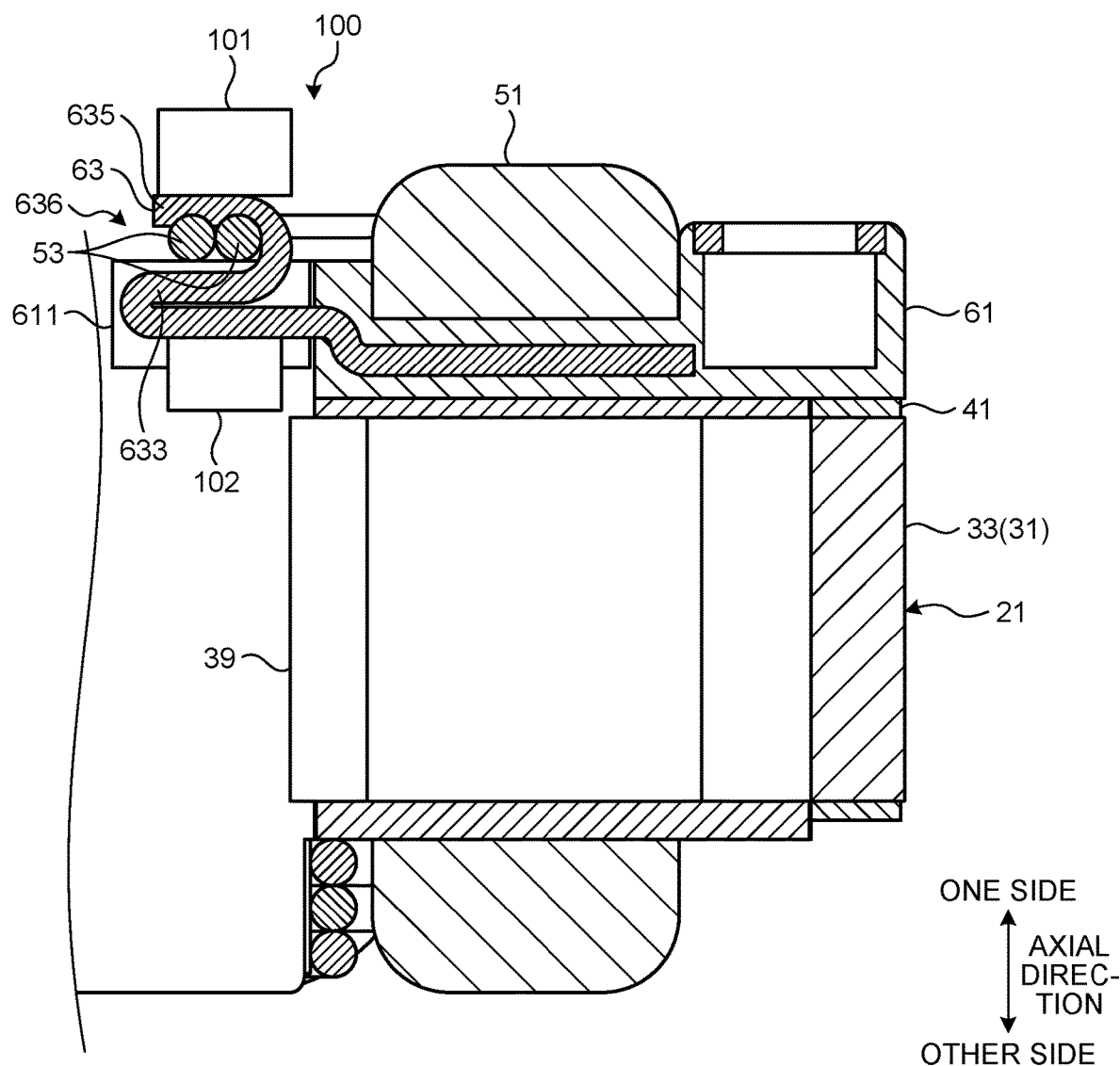
FIG. 26 is a drawing for explaining the method of assembling the stator according to the embodiment.

As shown in FIG. 26, after the coils 51 have been wound, the wires 53 and the fusing terminals 63 are connected by a fusing apparatus 100. Wires 53 are disposed between the first plate part 633 and the second plate part 635 of the fusing terminal 63. Wires 53 are inserted between the first plate part 633 and the second plate part 635 through the opening 636.

The fusing apparatus 100 comprises a first electrode 101 and a second electrode 102. The first electrode 101 is disposed upward of the fusing terminal 63. The second electrode 102 is disposed downward of the fusing terminal 63. The fusing terminal 63 is disposed more inward in the radial direction than the inner surface 39 of the stator core 30. Consequently, with regard to the fusing apparatus 100, the second electrode 102, which is disposed in the interior of the stator core 30, can be disposed downward of the fusing terminal 63.

In the state in which wires 53 is disposed between the first plate part 633 and the second plate part 635, the fusing apparatus 100 presses the fusing terminal 63 via the first electrode 101 and the second electrode 102 so as to bring the first plate part 633 and the second plate part 635 proximate to one another. In addition, the fusing apparatus 100 heats the fusing terminal 63 while pressing the fusing terminal 63 via the first electrode 101 and the second electrode 102. Thereby, the wires 53 and the fusing terminal 63 are connected by fusing.

The number of first electrodes 101 of the fusing apparatus 100 is the same as the number of fusing terminals 63. The number of second electrodes 102 of the fusing apparatus 100 is the same as the number of fusing terminals 63. The first electrodes 101 are disposed upward of the fusing terminals 63. The second electrodes 102 are disposed downward of the fusing terminals 63. The locations of the fusing terminals 63 in the axial direction are the same. The fusing apparatus 100 can simultaneously connect the wires 53 with the plurality of fusing terminals 63.

Figure 27:
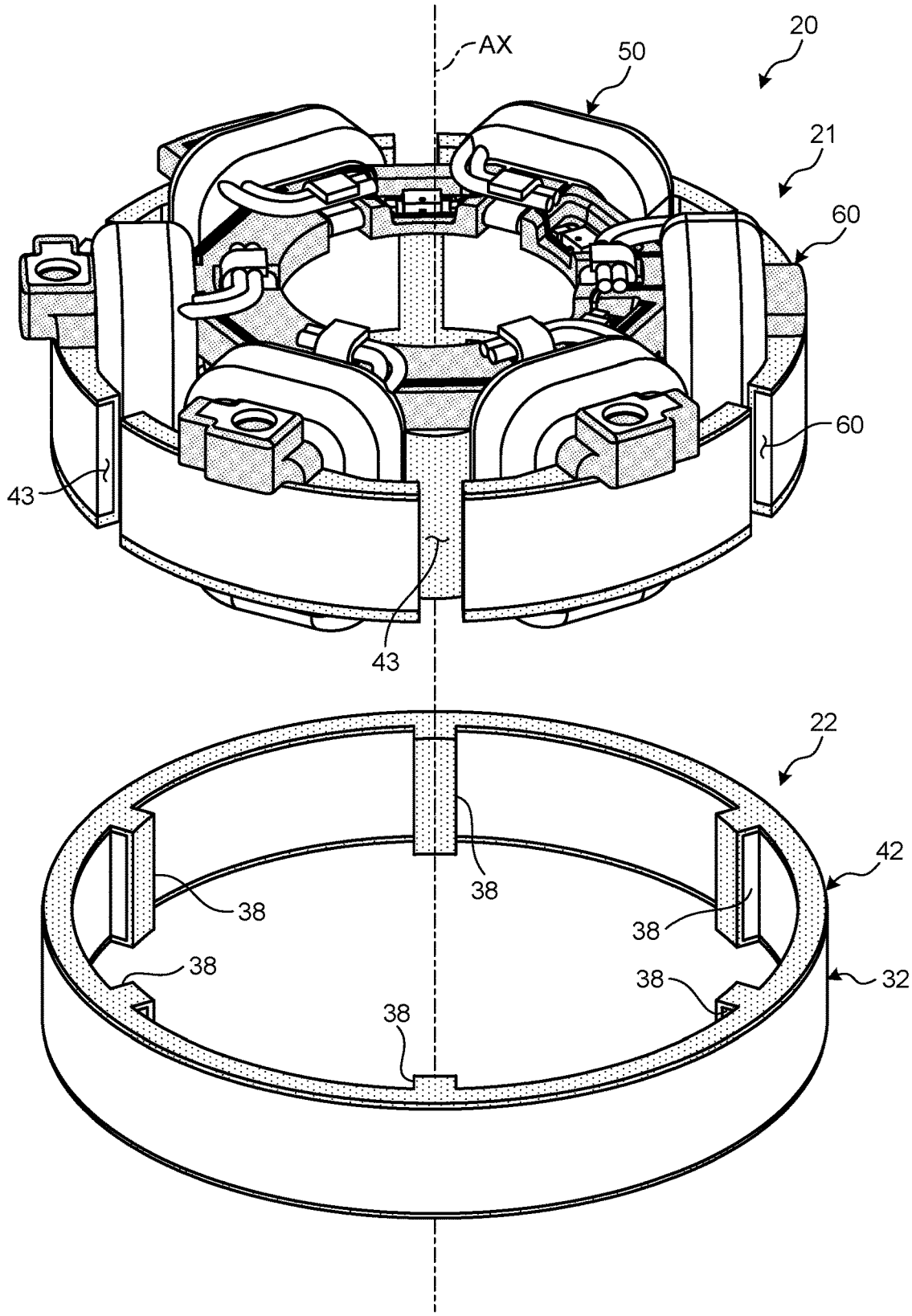
FIG. 27 is a drawing for explaining the method of assembling the stator according to the embodiment.

As shown in FIG. 27, by virtue of the interior member 21, on which the coils 51 and the terminal unit 60 are mounted, being press fitted into the exterior member 22 in the axial direction, the interior member 21 and the exterior member 22 are coupled to one another. The interior member 21 is press fitted into the exterior member 22 such that the protruding parts 38 of the exterior member 22 fit into the gaps 43 of the interior member 21. Thereby, the stator 20 is formed.

It is noted that the interior member 21 and the exterior member 22 may be fixed by press fitting, welding, or bolts.

Effects

As explained above, according to the embodiment, the fusing terminals 63, which are connected to the coils 51, are disposed more inward in the radial direction than the coils 51. Consequently, the dimension of the stator 20 in the radial direction becomes small. Thereby, compactness of the motor 8 can be achieved. Accordingly, compactness of the power tool 1 can be achieved.

At least a portion of each of the fusing terminals 63 is disposed more inward in the radial direction than the inner surface 39 of the stator core 30. In the past, it was often the case that space inward of the stator core was dead space. According to the embodiment, at least a portion of each of the fusing terminals 63 is disposed more inward in the radial direction than the inner surface 39 of the stator core 30. According to the embodiment, dead space is effectively utilized, and thereby compactness of the motor 8 is achieved.

The fusing terminals 63 are connected to the coils 51 via the wires 53, which protrude inward in the radial direction from the coils 51. Thereby, the fusing terminals 63, which are disposed more inward in the radial direction than the coils 51, and the coils 51 are smoothly connected.

Each of the fusing terminals 63 comprises: the first plate part 633; the second plate part 635, which is disposed on the one side in the axial direction of the first plate part 633; the curved part 634, which connects the end portion of the first plate part 633 that is outward in the radial direction and the end portion of the second plate part 635 that is outward in the radial direction; and the opening 636, which is defined between the end portion of the first plate part 633 that is inward in the radial direction and the end portion of the second plate part 635 that is inward in the radial direction. Wires 53 are inserted between the first plate part 633 and the second plate part 635 via the opening 636. Thereby, in the state in which wires 53 are disposed between the first plate part 633 and the second plate part 635, the fusing apparatus 100 can heat the fusing terminal 63, using the first electrode 101 and the second electrode 102 disposed in the axial direction, while pressing it.

A plurality of the fusing terminals 63 is disposed around the rotational axis AX. The locations of the fusing terminals 63 in the axial direction are the same. Thereby, the fusing apparatus 100 can simultaneously connect the wires 53 with the plurality of fusing terminals 63.

At least a portion of the support member 61 is disposed more inward in the radial direction than the coils 51. Consequently, the support member 61 can properly support the fusing terminals 63. In addition, because at least a portion of the support member 61 is disposed more inward in the radial direction than the coils 51, the dimension of the stator 20 in the radial direction becomes small. Thereby, compactness of the motor 8 can be achieved.

At least a portion of the support member 61 is disposed more inward in the radial direction than the inner surface 39 of the stator core 30. Thereby, dead space is effectively utilized, and thereby compactness of the motor 8 is achieved.

The support member 61 is disposed on the one side in the axial direction of the stator core 30 and is supported by the stator core 30. Thereby, the dimension of the stator 20 in the axial direction becomes small. Consequently, compactness of the motor 8 can be achieved.

The coils 51 are disposed such that they are wound around at least a portion of the support member 61. In the embodiment, the coils 51 are disposed such that they are wound around the tooth parts 36 and the protruding parts 612. The terminal unit 60 and the stator core 30 are fixed by the coils 51. In addition, the dimension of the stator 20 in the axial direction becomes small.

The support member 61 supports not only the fusing terminals 63 but also the short-circuiting members 64. Consequently, compactness of the stator 20 can be achieved.

The fusing terminals 63 and the short-circuiting members 64 are integral. Consequently, the process of manufacturing the terminal unit 60 is simplified. In addition, at least a portion of each of the short-circuiting members 64 and at least a portion of each of the signal lines 67 is disposed in the interior of the support member 61. The terminal unit 60 comprises a molded interconnect device (MID: molded interconnect device). Consequently, compactness of the terminal unit 60 can be achieved.

At least portion of the short-circuiting members 64 are disposed more inward in the radial direction than the coils 51 and are connected to the fusing terminals 63. At least portions of the short-circuiting members 64 are disposed more outward in the radial direction than the coils 51 and are connected to the exterior terminals 62. At least a portion of each of the fusing terminals 63, the exterior terminals 62, and the short-circuiting members 64 is disposed within a plane orthogonal to the rotational axis AX. Consequently, the dimension of the terminal unit 60 in the axial direction becomes small.

The support member 61 supports not only the fusing terminals 63 and the short-circuiting members 64 but also the rotation-detection devices 65. Consequently, compactness of the stator 20 can be achieved.

The terminal unit 60, which comprises the support member 61, is disposed between the centers and the one-side end portions of the coils 51 in the axial direction. That is, at locations proximate to the end portions of the coils 51 on the one side in the axial direction, the terminal unit 60 is disposed such that it does not protrude in the axial direction beyond the coils 51. Consequently, the dimension of the stator 20 in the axial direction becomes small.

The crossover wires 52 are disposed between the centers and the other-side end portions of the coils 51 in the axial direction. That is, at locations proximate to the end portions of the coils 51 on the other side in the axial direction, the crossover wires 52 are disposed such that they do not protrude in the axial direction beyond the coils 51. Consequently, the dimension of the stator 20 in the axial direction becomes small.

The stator 20 comprises: the interior member 21, around which the coils 51 are wound; and the exterior member 22, which is disposed around the interior member 21. The interior member 21 comprises: the plurality of core segments 33, each of the core segments 33 having the tooth part 36 around which one of the coils 51 is wound; and the interior insulator 41, which couples the plurality of the core segments 33. The plurality of core segments 33 is coupled by the interior insulator 41, and therefore deviations in the relative positions of the tooth parts 36 are curtailed.

When the coils 51 are wound around the tooth parts 36 and the protruding parts 612, the nozzle is inserted between a tooth part 36 and a protruding part 612 that are adjacent to one another via a gap 43, and the nozzle goes around the tooth part 36 and the protruding part 612. Because the spacing between the tooth part 36 and the protruding part 612 that are adjacent to one another is large, space for the nozzle to move is sufficiently ensured. Consequently, the work of winding the coils 51 around the tooth parts 36 and the protruding parts 612 is performed with good efficiency. In addition, the coils 51 are properly wound around the tooth parts 36 and the protruding parts 612 in an aligned state. Consequently, the space factor of the coils 51 is increased.

The interior member 21 has the gaps 43, in which the protruding parts 38 of the exterior member 22 fit. Thereby, the interior member 21 and the exterior member 22 are positioned with high accuracy, and thereby are properly coupled to one another.

The crossover wires 52 are disposed around the protruding parts 41T of the interior insulator 41. Thereby, the crossover wires 52 are disposed with good efficiency.

OTHER EMBODIMENTS

It is noted that, in the embodiments described above, it was assumed that the power tool 1 is a hammer driver-drill. The power tool 1 is not limited to being a hammer driver-drill. A driver drill, an angle drill, an impact driver, a grinder, a hammer, a hammer drill, a circular saw, and a reciprocating saw are illustrative examples of the power tool 1.

In the embodiments described above, it was assumed that the electric work machine is a power tool. The electric work machine is not limited to being a power tool. A gardening tool is an illustrative example of an electric work machine. A chain saw, a hedge trimmer, a lawn mower, a mowing machine, and a blower are illustrative examples of gardening tools.

In the embodiments described above, it was assumed that the battery pack 11, which is mounted on the battery-mounting part 7, is used as the power supply of the electric work machine. A commercial power supply (AC power supply) may be used as the power supply of the electric work machine.

EXPLANATION OF THE REFERENCE NUMBERS

1 Power tool (electric work machine)
2 Grip housing
3 Main-body housing
3A Air-suction port
3B Air-exhaust port
4 Motor housing
5 Gear housing
6 Output shaft
7 Battery-mounting part
8 Motor
9 Rear cover
10 Power-transmission mechanism
11 Battery pack
12 Trigger switch
13 Forward/reverse-change lever
14 Speed-change lever
15 Mode-change ring
16 Change ring 17 Light
18 Controller
19 Rotor
19S Rotor shaft
20 Stator
21 Interior member
22 Exterior member
30 Stator core
31 Interior core
32 Exterior core
32A Inner surface
32B Outer surface
32C End surface
32D End surface
32E Inner surface
32F Side surface
32G Side surface
33 Core segment
33A Inner surface
33B Outer surface
33C End surface
33D End surface
33E Opposing surface
33F Opposing surface
33G Side surface
33H Side surface
33I Side surface
33J Side surface
34 Inner-wall part
34T Protruding part
35 Outer-wall part
35T Protruding part
36 Tooth part
37 Circular-tube part
38 Protruding part
39 Inner surface
40 Insulator
41 Interior insulator
41C Covering part
41D Covering part
41E Covering part
41F Covering part
41G Covering part
41H Covering part
41J Coupling part
41S Space
41T Protruding part
42 Exterior insulator
42C Covering part
42D Covering part
42E Covering part
43 Gap
50 Coil unit
51 Coil
51U U-phase coil
51V V-phase coil
51W W-phase coil
52 Crossover wire
52U Crossover wire
52V Crossover wire
52W Crossover wire
53 Wire
53U Wire
53UE Winding-end portion
53US Winding-start portion
53V Wire
53VE Winding-end portion
53VS Winding-start portion
53W Wire
53WE Winding-end portion
53WS Winding-start portion
60 Terminal unit
61 Support member
62 Exterior terminal
62U U-phase, outer-part terminal
62V V-phase, outer-part terminal
62W W-phase, outer-part terminal
63 Fusing terminal
63U Fusing terminal
63V Fusing terminal
63W Fusing terminal
64 Short-circuiting member
64U Short-circuiting member
64V Short-circuiting member
64W Short-circuiting member
65 Rotation-detection device
66 Signal terminal
67 Signal line
68 Recessed part
69 Recessed part
70 Support part
71 Hole
100 Fusing apparatus
101 First electrode
102 Second electrode
611 Ring-shaped part
611A End surface
611B End surface
611C Inner surface
611D Outer surface
612 Protruding part
612A End surface
612B End surface
613 Opening
631 Base part
632 Connecting part
633 First plate part
634 Curved part
635 Second plate part
636 Opening
6121 First protruding part
6122 Second protruding part
6123 Third protruding part
6124 Fourth protruding part
6125 Fifth protruding part
6126 Sixth protruding part

The invention claimed is:

1. An electric work machine, comprising:
a motor having a stator and a rotor, which is disposed in an interior of the stator and is rotatable about a rotational axis; and
an output shaft, on which a tool accessory is mountable and which is configured to be driven using motive power transmitted from the motor;
wherein the stator has:
a stator core having teeth that are detachably engageable with, and extend radially inward of, an inner diameter side of an annular yoke;
an insulator disposed so as to cover at least a portion of surfaces of the stator core;
coils respectively wound around the teeth and portions of the insulator, the coils including at least one U-phase coil, at least one V-phase coil, and at least one W-phase coil;

interior terminals disposed more inward in a radial direction of the stator core than the coils, the interior terminals including a U-phase interior terminal electrically connected to the at least one U-phase coil, a V-phase interior terminal electrically connected to the at least one V-phase coil, and a W-phase interior terminal electrically connected to the at least one W-phase coil;

exterior terminals including at least a U-phase exterior terminal formed integrally with the at least one U-phase interior terminal, a V-phase exterior terminal formed integral with the at least one V-phase interior terminal, and a W-phase exterior terminal formed integral with the at least one W-phase interior terminal; and a support member, which is mounted on the stator and supports the interior terminals and the exterior terminals;

wherein electrical connection portions between the coils and the interior terminals are disposed more inward in the radial direction of the stator core than radially innermost surfaces of the teeth.

2. The electric work machine according to claim 1, wherein:
the support member is made of an electrically insulating material;
the support member has a ring-shaped part, which is disposed more inward in the radial direction of the stator core than the first coils, and protruding parts, which protrude outward in the radial direction from the ring-shaped part;
the protruding parts are respectively adjacent to the teeth in an axial direction of the stator core; and
the coils are respectively wound around the teeth and the protruding parts.

3. The electric work machine according to claim 2, further comprising:
rotation-detection devices configured to detect rotation of the rotor;
wherein the rotation-detection devices are disposed more inward in the radial direction than the radially innermost surfaces of the teeth.

4. The electric work machine according to claim 1, wherein:
the support member has at least three recessed parts, which are recessed outward in the radial direction from a radially inner surface of the support member; and
each of the three interior terminals is disposed radially inward of any one of the at least three recessed parts.

5. The electric work machine according to claim 1, wherein each of the three interior terminals includes:
a first part disposed on a first side in an axial direction of the stator core with respect to wires of the coils connected to the terminal; and
a second part disposed on a second side in the axial direction with respect to the wires of the coils connected to the terminal.

6. The electric work machine according to claim 1, wherein the U-phase interior terminal, the V-phase interior terminal, and the W-phase interior terminal are each electrically connected to a power supply.

7. The electric work machine according to claim 1, wherein either (i) at least a portion of each of the three exterior terminals or (ii) at least a portion of each of the U-phase exterior terminal, the V-phase exterior terminal, and the W-phase exterior terminal is respectively integral with the three interior terminals and is disposed in an interior of the support member, so that the support member supports the three interior terminals, the U-phase external terminal, the V-phase external terminal, and the W-phase external terminal.

8. The electric work machine according to claim 1, wherein:
the teeth are a plurality of core segments having identical shapes and dimensions, the core segments are held by the insulator.

9. The electric work machine according to claim 8, wherein:
the support member has at least three recessed parts, which are recessed outward in the radial direction from a radially inner surface of the support member; and
each of the three interior terminals is disposed radially inward of any one of the at least three recessed parts.

10. The electric work machine according to claim 9, wherein:
arcuate recesses are defined on an inner circumferential surface of the annular yoke; and
the teeth are respectively inserted and fitted into the recesses.

11. The electric work machine according to claim 10, wherein:
the interior terminals are fusing terminals,
the electrical connection portions are wires, and
the wires are respectively connected to the coils.

12. The electric work machine according to claim 11, wherein either (i) at least a portion of each of the three exterior terminals or (ii) at least a portion of each of the U-phase exterior terminal, the V-phase exterior terminal, and the W-phase exterior terminal is respectively integral with the three interior terminals and is disposed in an interior of the support member, so that the support member supports the three interior terminals, the U-phase external terminal, the V-phase external terminal, and the W-phase external terminal.

13. The electric work machine according to claim 12, wherein the U-phase interior terminal, the V-phase interior terminal, and the W-phase interior terminal are each electrically connected to a power supply.

14. The electric work machine according to claim 13, wherein each of the three interior terminals includes:
a first part disposed on a first side in an axial direction of the stator core with respect to wires of the coils connected to the terminal; and
a second part disposed on a second side in the axial direction with respect to the wires of the coils connected to the terminal.

15. The electric work machine according to claim 1, wherein:
recesses are defined on an inner circumferential surface of the annular yoke; and
the teeth are respectively disposed in the recesses.

16. The electric work machine according to claim 1, wherein:
the interior terminals are fusing terminals,
the electrical connection portions are wires, and
the wires are respectively connected to the coils.

17. An electric work machine, comprising:
a motor having a stator and a rotor, which is disposed in an interior of the stator and is rotatable about a rotational axis; and
an output shaft, on which a tool accessory is mountable and which is configured to be driven using motive power transmitted from the motor;

wherein the stator has:
  a stator core;
  a first coil and a second coil respectively wound on portions of the stator core;
  a first fusing terminal electrically connected to the first coil, and a second fusing terminal electrically connected to the second coil;
  a short-circuiting member, which electrically connects the first fusing terminal and the second fusing terminal;
  a rotation-detection device configured to detect rotation of the rotor; and
  a support member, which supports the first and second fusing terminals, the short-circuiting member, and the rotation-detection device, and is made of an insulating material:
wherein:
the rotation-detection device is disposed more inward in a radial direction of the stator core than the first and second coils;
the stator comprises a signal terminal, which is disposed more outward in the radial direction than the first and second coils and is electrically connected to the rotation-detection device via a signal line; and
at least a portion of the signal line is disposed in an interior of the support member.

18. The electric work machine according to claim 17, wherein the support member is disposed between centers and first axial end portions of the first and second coils in an axial direction of the stator core, the axial direction of the stator core being perpendicular to the radial direction.

19. The electric work machine according to claim 18, further comprising:
  a crossover wire electrically connecting the first and second coils;
  wherein the crossover wire is disposed between the centers and second axial end portions of the first and second coils in the axial direction.

* * * * *